(12) United States Patent
Williams

(10) Patent No.: US 8,560,456 B2
(45) Date of Patent: Oct. 15, 2013

(54) SYSTEM AND METHOD FOR AN ANONYMOUS EXCHANGE OF PRIVATE DATA

(75) Inventor: Jason S. Williams, Braselton, GA (US)

(73) Assignee: Credigy Technologies, Inc., Las Vegas, NV (US)

( * ) Notice: Subject to any disclaimer, the term of this patent is extended or adjusted under 35 U.S.C. 154(b) by 1568 days.

(21) Appl. No.: 11/293,646

(22) Filed: Dec. 2, 2005

(65) Prior Publication Data

US 2007/0130070 A1    Jun. 7, 2007

(51) Int. Cl.
*G06Q 20/00* (2012.01)
*G06F 15/16* (2006.01)

(52) U.S. Cl.
USPC .............................. 705/67; 709/201; 709/229

(58) Field of Classification Search
USPC ....................................................... 705/1–79
See application file for complete search history.

(56) References Cited

U.S. PATENT DOCUMENTS

| | | | |
|---|---|---|---|
| 5,542,046 A | | 7/1996 | Carlson et al. |
| 5,815,665 A | | 9/1998 | Teper et al. |
| 5,845,070 A | | 12/1998 | Ikudome |
| 5,872,847 A | | 2/1999 | Boyle et al. |
| 5,991,758 A | * | 11/1999 | Ellard ................................ 707/6 |
| 6,061,789 A | | 5/2000 | Hauser et al. |
| 6,205,472 B1 | | 3/2001 | Gilmour |
| 6,253,203 B1 | | 6/2001 | O'Flaherty et al. |
| 6,275,824 B1 | | 8/2001 | O'Flaherty et al. |
| 6,308,203 B1 | | 10/2001 | Itabashi et al. |
| 6,311,169 B2 | | 10/2001 | Duhon |
| 6,363,488 B1 | | 3/2002 | Ginter et al. |

(Continued)

FOREIGN PATENT DOCUMENTS

| | | |
|---|---|---|
| EP | 1 089 200 A2 | 4/2001 |
| WO | WO 98/03927 | 1/1998 |

(Continued)

OTHER PUBLICATIONS

Alexander Stasiv, Gergana Krumova, Lazar Adzigogov, and Mariana Marin; "Design Document for Project Access Control and Billing in Peer-to-Peer Environment" Version 1.0; Feb. 18, 2004; pp. 1-18.

(Continued)

*Primary Examiner* — Alexander Kalinowski
*Assistant Examiner* — Murali Dega
(74) *Attorney, Agent, or Firm* — King & Spalding

(57) ABSTRACT

Facilitating the purchase and sale of private data between anonymous entities based on the use of encryption and a centralized on-line entity to exchange the private data in a secure environment. The seeker of private data, such as consumer information, transmits an encrypted query to the centralized exchange entity. The query submission includes legal representations stating the legally permissible purpose for seeking the information. The centralized exchange entity compares the encrypted query to an encrypted data index collected from at least one data provider, to determine if the query matches any private data held by a data provider. The comparison is conducted within a secure, search component to ensure the privacy of all data and all parties to the transaction. The exchange entity facilitates the anonymous exchange between the data purchaser and the data provider. A payment invoice can be generated and electronically presented by maintainer. The payment may be electronically debited from the designated account of a data purchaser and remitted to a data provider. In addition, a portion of such funds may be retained by the centralized exchange entity.

41 Claims, 10 Drawing Sheets

(56) References Cited

U.S. PATENT DOCUMENTS

| | | | |
|---|---|---|---|
| 6,438,544 B1 | 8/2002 | Grimmer et al. | |
| 6,449,621 B1 | 9/2002 | Pettovello | |
| 6,480,850 B1 | 11/2002 | Veldhuisen | |
| 6,581,059 B1 | 6/2003 | Barrett et al. | |
| 6,636,854 B2 | 10/2003 | Dutta et al. | |
| 6,714,944 B1 | 3/2004 | Shapiro et al. | |
| 6,845,448 B1 | 1/2005 | Chaganti et al. | |
| 6,859,931 B1 | 2/2005 | Cheyer | |
| 6,886,101 B2 | 4/2005 | Glazer et al. | |
| 6,938,022 B1 | 8/2005 | Singhal | |
| 6,947,921 B2 | 9/2005 | Notargiacomo et al. | |
| 7,181,017 B1* | 2/2007 | Nagel et al. | 380/282 |
| 7,630,986 B1* | 12/2009 | Herz et al. | 1/1 |
| 2001/0051515 A1 | 12/2001 | Rygaard | |
| 2002/0010679 A1 | 1/2002 | Felsher | |
| 2002/0019764 A1 | 2/2002 | Mascarenhas | |
| 2002/0049628 A1 | 4/2002 | West et al. | |
| 2002/0052825 A1 | 5/2002 | Bensemana | |
| 2002/0069117 A1 | 6/2002 | Carothers et al. | |
| 2002/0069129 A1 | 6/2002 | Akutsu et al. | |
| 2002/0087878 A1 | 7/2002 | Ballen et al. | |
| 2002/0095454 A1* | 7/2002 | Reed et al. | 709/201 |
| 2002/0099824 A1 | 7/2002 | Bender et al. | |
| 2002/0103999 A1 | 8/2002 | Camnisch et al. | |
| 2002/0111816 A1 | 8/2002 | Lortscher et al. | |
| 2002/0111920 A1 | 8/2002 | Tresser | |
| 2002/0120461 A1 | 8/2002 | Kirkconnell-Ewing et al. | |
| 2002/0123937 A1 | 9/2002 | Pickover et al. | |
| 2002/0165783 A1 | 11/2002 | Gonthier et al. | |
| 2002/0174034 A1 | 11/2002 | Au et al. | |
| 2002/0178087 A1 | 11/2002 | Henderson et al. | |
| 2002/0178260 A1 | 11/2002 | Chang | |
| 2002/0178261 A1 | 11/2002 | Chang et al. | |
| 2002/0184530 A1 | 12/2002 | Spector | |
| 2002/0194108 A1 | 12/2002 | Kitze | |
| 2003/0004898 A1 | 1/2003 | McAuliffe et al. | |
| 2003/0018563 A1* | 1/2003 | Kilgour et al. | 705/37 |
| 2003/0028470 A1 | 2/2003 | Dutta | |
| 2003/0028585 A1 | 2/2003 | Yeager et al. | |
| 2003/0033237 A1* | 2/2003 | Bawri | 705/37 |
| 2003/0050791 A1 | 3/2003 | Kato | |
| 2003/0050980 A1 | 3/2003 | Dutta et al. | |
| 2003/0055894 A1 | 3/2003 | Yeager et al. | |
| 2003/0078858 A1 | 4/2003 | Angelopoulos et al. | |
| 2003/0088440 A1 | 5/2003 | Dunn | |
| 2003/0101348 A1 | 5/2003 | Russo | |
| 2003/0120498 A1 | 6/2003 | Villapudua | |
| 2003/0120928 A1 | 6/2003 | Cato et al. | |
| 2003/0126469 A1 | 7/2003 | King et al. | |
| 2003/0158785 A1 | 8/2003 | Erca | |
| 2003/0163413 A1 | 8/2003 | Wiczkowski | |
| 2003/0191933 A1 | 10/2003 | Xu et al. | |
| 2003/0200162 A1 | 10/2003 | Challener | |
| 2003/0204581 A1 | 10/2003 | Adar et al. | |
| 2003/0204605 A1 | 10/2003 | Hudson et al. | |
| 2004/0034601 A1 | 2/2004 | Kreuzer | |
| 2004/0034776 A1 | 2/2004 | Fernando et al. | |
| 2004/0039781 A1 | 2/2004 | LaVallee et al. | |
| 2004/0044776 A1* | 3/2004 | Larkin | 709/228 |
| 2004/0044790 A1 | 3/2004 | Loach et al. | |
| 2004/0054885 A1 | 3/2004 | Bartram et al. | |
| 2004/0068462 A1 | 4/2004 | Katz et al. | |
| 2004/0088219 A1 | 5/2004 | Sanders et al. | |
| 2004/0088348 A1 | 5/2004 | Yeager | |
| 2004/0098366 A1 | 5/2004 | Sinclair et al. | |
| 2004/0098465 A1* | 5/2004 | Seo | 709/217 |
| 2004/0098728 A1 | 5/2004 | Husain | |
| 2004/0111359 A1 | 6/2004 | Hudock | |
| 2004/0111360 A1* | 6/2004 | Albanese | 705/38 |
| 2004/0122958 A1 | 6/2004 | Wardrop | |
| 2004/0133547 A1 | 7/2004 | Doi | |
| 2004/0139025 A1 | 7/2004 | Coleman | |
| 2004/0143457 A1 | 7/2004 | Demirian et al. | |
| 2004/0148287 A1 | 7/2004 | Manion et al. | |
| 2004/0148333 A1 | 7/2004 | Manion et al. | |
| 2004/0162053 A1 | 8/2004 | Lee | |
| 2004/0167858 A1 | 8/2004 | Erickson | |
| 2004/0176995 A1 | 9/2004 | Fusz | |
| 2004/0181511 A1 | 9/2004 | Xu et al. | |
| 2004/0199402 A1 | 10/2004 | Walker et al. | |
| 2004/0230511 A1 | 11/2004 | Kannan et al. | |
| 2004/0235521 A1 | 11/2004 | Pradhan et al. | |
| 2004/0267609 A1 | 12/2004 | McCauley | |
| 2005/0004804 A1 | 1/2005 | English | |
| 2005/0004870 A1 | 1/2005 | McGaughey | |
| 2005/0004978 A1* | 1/2005 | Reed et al. | 709/203 |
| 2005/0015506 A1 | 1/2005 | Padborg | |
| 2005/0021398 A1 | 1/2005 | McCleskey et al. | |
| 2005/0027871 A1 | 2/2005 | Bradley et al. | |
| 2005/0060584 A1 | 3/2005 | Ginter et al. | |
| 2005/0071280 A1 | 3/2005 | Irwin et al. | |
| 2005/0091487 A1 | 4/2005 | Cross et al. | |
| 2005/0108341 A1 | 5/2005 | Mathew et al. | |
| 2005/0131757 A1 | 6/2005 | Chan et al. | |
| 2005/0144082 A1* | 6/2005 | Coolman et al. | 705/26 |
| 2005/0144129 A1* | 6/2005 | Coolman et al. | 705/40 |
| 2005/0154886 A1 | 7/2005 | Birk et al. | |
| 2005/0160176 A1* | 7/2005 | Seales et al. | 709/229 |
| 2005/0177742 A1* | 8/2005 | Benson et al. | 713/189 |
| 2005/0192849 A1 | 9/2005 | Spalding, Jr. | |
| 2005/0216295 A1* | 9/2005 | Abrahamsohn | 705/1 |
| 2006/0020783 A1* | 1/2006 | Fisher | 713/156 |
| 2006/0083214 A1* | 4/2006 | Grim et al. | 370/351 |
| 2006/0085370 A1 | 4/2006 | Groat et al. | |
| 2007/0074043 A1 | 3/2007 | Lacey | |
| 2007/0203820 A1* | 8/2007 | Rashid | 705/37 |
| 2008/0141337 A1 | 6/2008 | Yeung et al. | |

FOREIGN PATENT DOCUMENTS

| | | |
|---|---|---|
| WO | WO 01/33936 A2 | 5/2001 |
| WO | WO 03054667 A2 | 7/2003 |
| WO | WO 03/071446 A1 | 8/2003 |
| WO | WO 03071446 A1 | 8/2003 |

OTHER PUBLICATIONS

Neal Athorne, Babak Esfandiari, Aloke Mukherjee; Dept. of Systems and Computer Engineering, Carleton University, Ottawa, Canada; "U-P2P: A Peer-to-Peer Framework for Universal Resource Sharing and Discovery;" 2003; pp. 29-38.

Jo Maitland, Senior Editor; Boardwatch; "P2P Billing Arrives;" Sep. 9, 2003; pp. 1-2.

Brian Buehling; XML.com; "P2P and XML in Business;" Jul. 11, 2001; pp. 1-3.

www.cpexchange.com Press Release; "CPExchange Launches New Global Privacy-Enabled Customer Data Interchange Standard to Improve e-Business Customer Relationships;" 2000; pp. 1-2.

Robert O'Harrow, Jr., Washington Post; "Internet Firms Act to Ease Sharing of Personal Data;" Dec. 5, 2000; p. E01; pp. 1-3.

Blake T. Bilstad, Esq., and Keith P. Enright, Esq.; www.faqs.org; "E-Commerce: An Introduction, Consumer Privacy;" 2000; pp. 1-24.

Li Zhou and Chinya V. Ravishankar; Dept. of Computer Science & Engineering, University of California, Riverside, Riverside, California; "Efficient, Authenticated, and Fault-Tolerant Key Agreement for Dynamic Peer Groups;" 2004; pp. 759-770.

Chris McKean; SANS Institute; "Peer-to-Peer Security and Intel's Peer-to-Peer Trusted Library;" Aug. 20, 2001; Version 1.2e (amended May 22, 2001); 7 pages.

Giuseppe Ateniese, Michael Steiner, and Gene Tsudik; "New Multiparty Authentication Services and Key Agreement Protocols;" IEEE Journal on Selected Areas in Communications; vol. 18, No. 4; Apr. 2000; pp. 628-636.

Wee Siong Ng, Beng Chin Ooi, Kian-Lee Tan, and Aoying Zhou; "PeerDB: A P2P-based System for Distributed Data Sharing;" IEEE ICDE; 2003; 10 pages.

Joe Prokop; "Scribe Notes on PeerDB: A P2P-based System for Distributed Data Sharing;" Sep. 17, 2003; pp. 1-2.

Hyunrok Lee, and Kwangjo Kim; "An Adaptive Authentication Protocol Based on Reputation for Peer-to-Peer System;" pp. 1-6.

(56) References Cited

OTHER PUBLICATIONS

Boris Dragovic, Evanelos Kotsovinos, Steven Hand, and Peter R. Pietzuch; University of Cambridge Computer Laboratory, Cambridge, UK; "XenoTrust: Event-based distributed trust management;" 5 pages.

Kyung-Ah Chang, Software Center, Samsung Electronics Co., Ltd., Seoul, Korea; Byung-Rae Lee and Tai Yun Kim, Department of Computer Science and Engineering, Korea University, Seoul, Korea; Open Authentication Model Supporting Electronic Commerce in Distributed Computing,: 2002; pp. 135-141 and 143-149.

F. Strauss, S. Schmidt, and T.U. Braunschweig; Network Working Group, Internet-Draft; "P2P Chat—A Peer-to-Peer Chate Protocol;" Jul. 8, 2004; pp. 1-8, 1-26.

Raymond Gao; "P2P Yardsale Engine (Project Venezia) & P2P Yardsale Application (Project Gondola);" Mar. 31, 2004; pp. 1-18.

Petros Daras, Despoina Palaka, Venetia Giagourta, Dimitrios Bechtsis, Kosmas Petridis, and Michael G. Strintzis, Informatics and Telematics Institute, Greece; "A Novel Peer-To-Peer Payment Protocol;" 2003; pp. 1-5.

Dimitri do B. DeFigueiredo; "Unleashing the Power of Digital Goods: Enabling New Business Models for the Music Industry;" Aug. 2003; pp. 1-21.

Mike Winter, University of Saskatchewan, Canada; "The Role of Trust and Security Mechanisms in an Agent-Based Peer Help System;" 10 pages.

Adrian Friday, Stephen P. Wade, Nigel Davies and Gordon S. Blair; Computing Department, Lancaster University; "The Tuple Space: An Old Solution to a New Problem?;" Sep. 30, 1997; pp. 1-6.

Stratvantage Consulting, LLC; "Peer-to-Peer Computing and Business Networks: More Than Meets the Ear Part 1—What is P2P?;" Dec. 2001; pp. 1-30.

Antone Gonsalves, "IBM Adds Data Privacy to Business Collaboration," May 24, 2005, Information Week, SOA Pipeline, http://informationweek.webservicespipeline.com/163700894, printed Jul. 22, 2005, pp. 1-3.

L. Jean Camp and Carlos A. Osorio, "Privacy-Enhancing Technologies for Internet Commerce," Date Unknown, Kennedy School of Government, Harvard University, pp. 7-21.

Paul Sholtz, "Economics of Personal Information Exchange," First Monday, Peer-Reviewed Journal on the Internet, http://www.firstmonday.org/issues/issue5_9/sholtz/, printed Jul. 22, 2005, pp. 1-11.

Tuomas Sandholm, "eMediator: A Next Generation Electronic Commerce Server," 2002, Blackwell Publishing, Computational Intelligence, vol. 18, No. 4, pp. 656-676.

N. Zhang, Q. Shi and M. Merabti, "An Efficient Protocol for Anonymous and Fair Document Excchange,", 2003, Computer Networks, vol. 41, pp. 19-28.

Shivkumar Krishnan and Jeffrey Uhlmann, "The Design of an Anonymous File Sharing System Based on Group Anonymity," 2004, Information and Software Technology, vol. 46, pp. 273-278.

Michael O. Brightwell, "Using Datatype-Preserving Encryption to Enhance Data Warehouse Security," 1997, http://www.csrc.nist.gov/nissc/1997/proceedings/11slides.pdf, pp. 1-11.

Comments from the Center for Democracy and Technology, Mar. 30, 2000, http://www.cdt.org/privacy/financial/000330mulligan.shtml, pp. 1-8.

"B2B Data Service Revolutionizes Search and Retrieval of Consumer Information," 2005, Case Study by PWI Software Innovations and Development Services, http://www.pwicorp.com/case_study_inf.html, pp. 1-2.

Citizen Heat Tip Reporting, http://www.miheat.org; printed Jun. 22, 2006, pp. 1.

Rita Lin, "E-Commerce: An Introduction, Consumer Privacy, Session 4," printed Jun. 22, 2006, http://www.faqs.org/docs/ecom/privacytext.html, pp. 1-24.

Anaas, George J., J.D., M.P.H. "HIPAA Regulations—A New Era of Medicine Privacy?" The New England Journal of Medicine, vol. 348, Apr. 10, 2003, pp. 1486-1490, http://nejm.highwire.org/cgi/content/full/348/15/1486.

\* cited by examiner

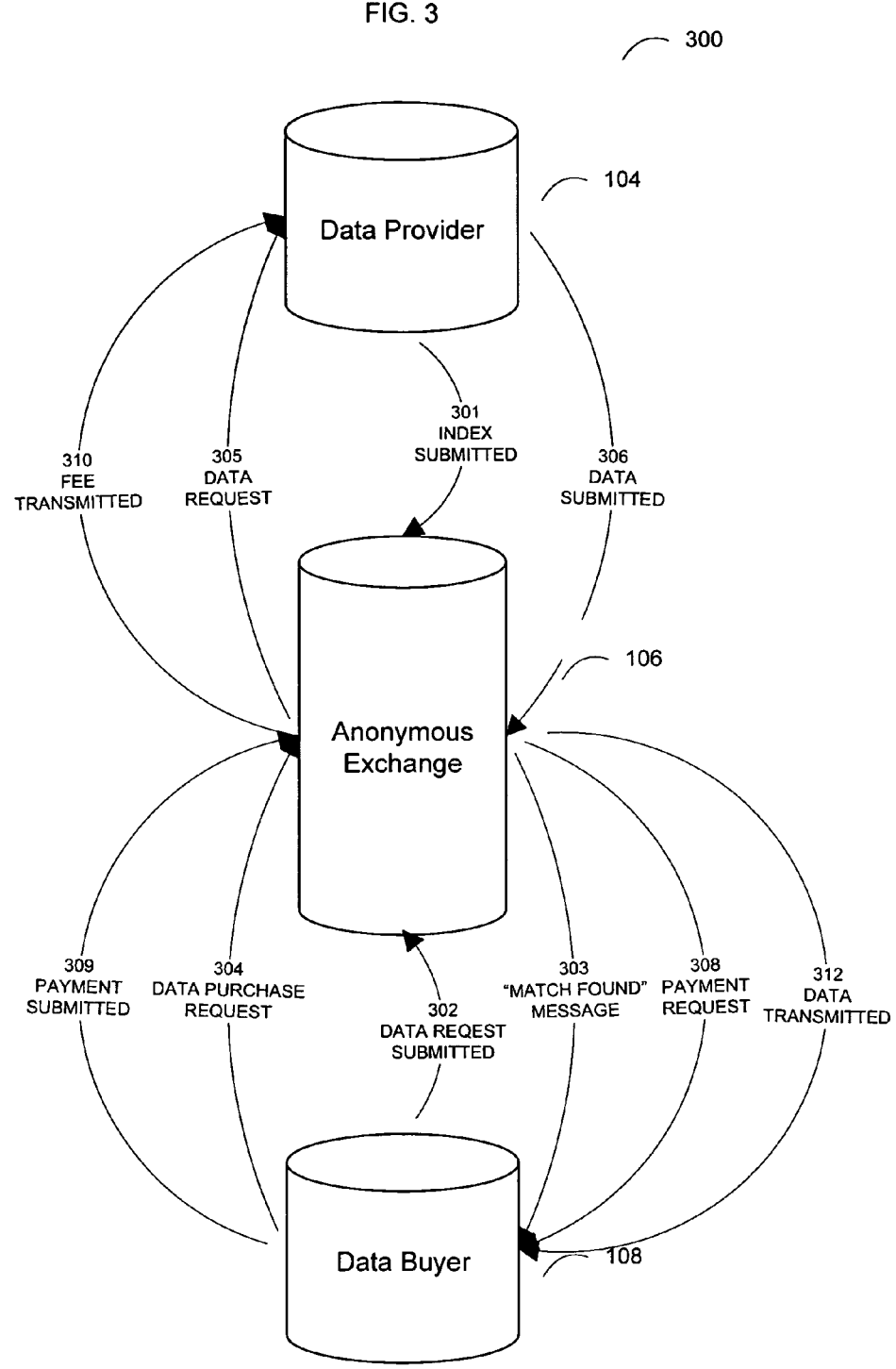

QUERYING INDICES

SELLING DATA

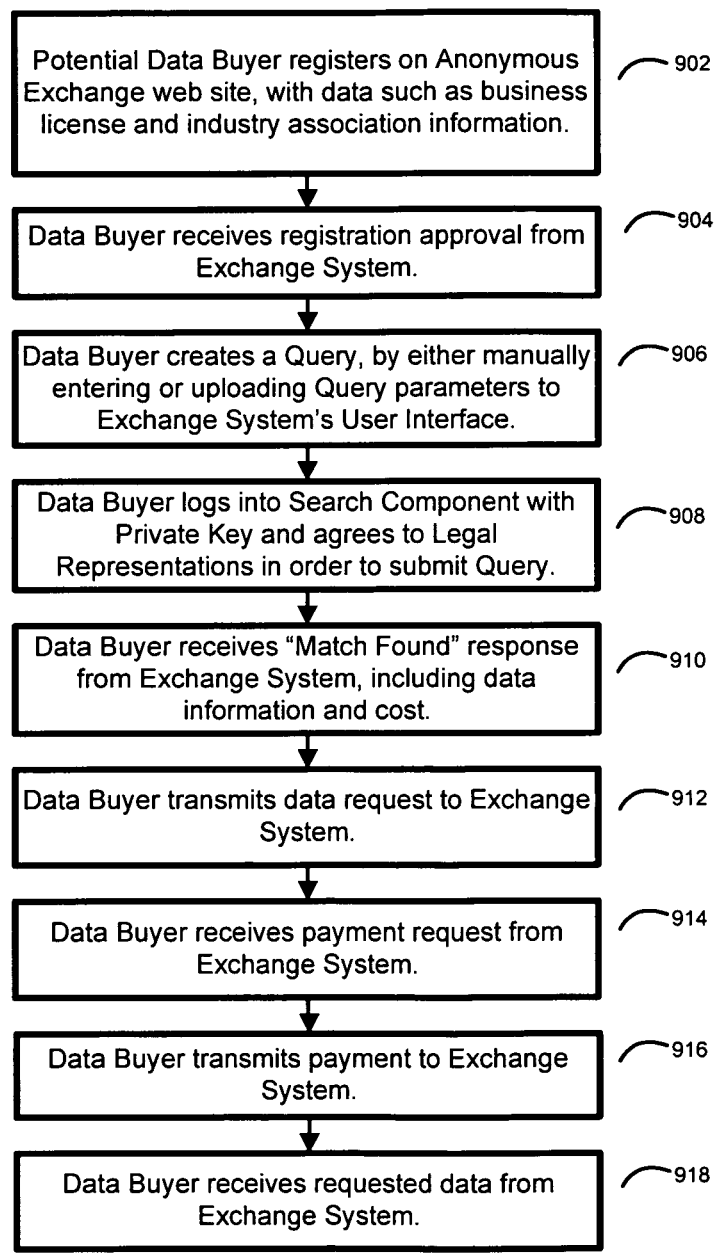

SYSTEM AND METHOD FOR AN ANONYMOUS EXCHANGE OF PRIVATE DATA

FIELD OF THE INVENTION

The invention relates generally to a data exchanging arrangement with a centralized exchange entity accessible over a computer network, and more particularly to a centralized entity on the Internet facilitating the purchase and sale of private data with anonymity while maintaining compliance with applicable law.

BACKGROUND OF THE INVENTION

In the modern marketplace, private third party electronic data is the raw material for a substantial, and growing, percentage of both commercial and non-commercial processes. Private data, such as a consumer's identity information, financial information, health care information and law enforcement records, is extremely valuable. Such data enables efficient automation of commercial and non-commercial processes while increasing process integrity through the integration of complex business rules which act on such data. Like anything of value, such data is often misappropriated for criminal purposes or utilized for unintended or non-compliant uses. At the same time, the legitimate demand for such data creates a need for unencumbered, automated access. The competing preferences of securing such data and making such data readily obtainable to facilitate legitimate commercial and non-commercial activity must be balanced in order to preserve marketplace liquidity, prevent criminal activity and preserve privacy. The balancing of these competing preferences most often results in complex, nested governmental regulatory requirements. Complying with such regulatory requirements typically has a significant overhead cost and often inhibits the deployment of efficient processes.

For example, banks, credit issuers and collection agencies must have current information on consumers in order to profitably extend credit and collect on delinquent accounts. This data allows the issuers of credit to offer capital to individuals across the spectrum of risk. Relative to the collection of delinquent accounts, businesses use the traditional methods of skip tracing to gather information on consumers while attempting to comply with the constantly changing, complex regulations concerning the use of such information. In addition, the information obtained through these traditional methods is often incorrect or outdated because it typically originates through a third party data broker which aggregates such information from a limited number of sources.

Many industries, such as mortgage application processors, utility companies and retail establishments, collect vast amounts of current information on individuals and business entities. These companies could earn revenue by providing timely data records to legitimate companies for legitimate purposes. However, the transfer of such data, being controlled by strict governmental regulation, makes it expensive and difficult to provide such data to legitimate users. As a result, a large and growing number of such entities could participate in the marketplace as data providers, but choose not to because of burdensome regulatory requirements and a general lack of expertise in connecting to the marketplace and selling such data.

In addition, there exists in the market a significant barrier to the aggregation of such data from such entities. An entity which aggregates and resells such data may very well be categorized as a regulated entity under such regulatory schemes as the Fair Credit Reporting Act (FCRA). Thus, there are potentially significant barriers not only for the providers of such data, but for the brokers of such data. The regulations governing brokers of such data may often be more complex and difficult to comply with than the regulations governing the providers of such data. Therefore, data brokering entities typically must charge a premium for brokered data.

There exists a need for a system that permits a third party intermediary, in what might traditionally be viewed as the role of a data broker, to facilitate a non-burdensome, compliant and timely provisioning of information from non-traditional data providers to data buyers directly, while mitigating the additional regulatory overhead costs typically associated with the role of a data broker. By facilitating the direct, anonymous exchange or such information between system users without gaining specific knowledge of the data exchanged, the third party intermediary is transformed from being a data broker to being a facilitator of direct exchange. In addition, such a system necessarily requires a mechanism which protects the significant capital outlay of the facilitator of direct exchange in establishing a network by preventing the users of such a network from learning the identity of the other network members. In the market today, no systems known in the art facilitate the exchange of private data between business entities with anonymity.

There exists a further need for a system to facilitate the anonymous purchase and sale of timely private data which enables the users to meet applicable regulatory requirements and the facilitator of the system to minimize regulatory obligations incumbent on traditional data brokers.

SUMMARY OF THE INVENTION

The present invention provides a methodology and system for allowing the anonymous exchange of encrypted private data in a manner that allows the users to meet the requirements of applicable regulatory schemes.

Advantageously, the invention provides an Anonymous Exchange that is easily accessible to all users, reduces the costs of purchasing private data and streamlines the strict processes of compliance with applicable laws and regulations. The anonymous nature of the exchange further provides an incentive to providers of data who might be hesitant to sell data in the marketplace in spite of the fact that they might otherwise be legally permitted to do so. Finally, the anonymous nature of the exchange provides significant economic incentive to the operators of the invention, by providing a method whereby the operator can protect a valuable network of data providers and data buyers which requires significant capital outlay to protect from misappropriation by third parties.

One aspect of the current invention lowers the cost of such an information exchange, by providing a method whereby data providers and data buyers contractually agree to legally permissible uses of the exchanged private data, in a standardized framework. By reducing the complexity of complying with the nested regulatory schemes, the cost of commerce is reduced while data privacy is protected. Both data providers and data buyers may contractually agree to certain legal representations concerning the use and transmission of the data. Similar to a "click wrap" software license, the on-line agreements are legally binding contracts. These contractual legal representations allow the users to meet the requirements of the applicable government laws and regulations concerning the use and transmission of consumer information or other confidential data.

To ensure that the privacy of data is maintained, a process of data encryption and secure transmissions is provided by the present invention. The Anonymous Exchange entity never has access to the underlying consumer information. In addition to maintaining consumer privacy, this mitigates the risk that the Exchange entity will be categorized as a Fair Credit Reporting Act (FCRA) regulated entity, or otherwise be subject to regulatory schemes targeted at traditional data brokers.

Another aspect of the invention expands the universe of available private data, such as consumer information, by allowing small companies, which would not typically be able to find and negotiate with data buyers, to share their valuable data. The present invention allows these companies to earn revenue by the sharing of this information for legally permissible purposes.

One aspect of the present invention provides an on-line Anonymous Exchange where a data buyer, such as a collection agency, may purchase consumer information for legally permissible purposes, such as collecting on a past-due account. In addition, a data provider, such as a pizza delivery company, may earn revenue by selling collected consumer information, while remaining anonymous to the data buyer.

The foregoing has broadly outlined some of the aspects and features of the present invention, which should be construed to be merely illustrative of various potential applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

BRIEF DESCRIPTION OF THE DRAWINGS

The accompanying drawings, which are incorporated in and constitute a part of this specification, illustrate embodiments of the invention, and together with the description, serve to explain the principles of the invention.

FIG. 3 is a process overview diagram for an exemplary embodiment of the present invention.

FIG. 9 is a workflow diagram for a "Purchasing Data" process of an exemplary embodiment of the present invention.

DETAILED DESCRIPTION OF THE EXEMPLARY EMBODIMENTS

Figure 1:
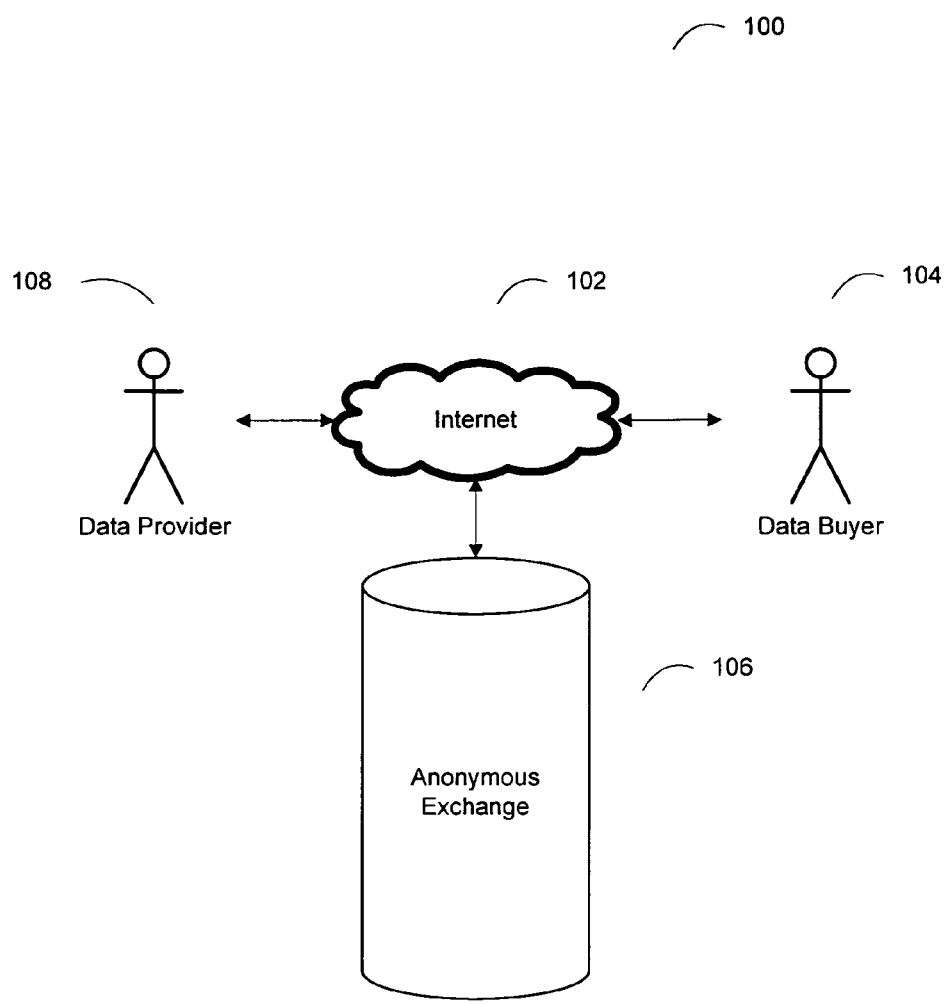
FIG. 1 is a context diagram for an Anonymous Exchange system constructed in accordance with an exemplary embodiment of the present invention.

Exemplary embodiments of the present invention are disclosed herein. It will be understood that the disclosed embodiments are merely examples to illustrate aspects of the invention that may be embodied in various and alternative forms. The figures are not necessarily to scale or in a sequential order, and some features may be exaggerated or minimized to show details of particular components. In other instances, well-known materials or methods have not been described in detail to avoid obscuring the present invention. Therefore, specific structural and functional details disclosed herein are not to be interpreted as limiting, but as a basis for the claims and for teaching one skilled in the art to variously employ the present invention.

As used in the description herein and attachments hereto, the meaning of "a," "an," and "the" includes plural reference unless the context clearly dictates otherwise. Also, as used in the description herein and attachments hereto, the meaning of "in" includes "in" and "on" unless the context clearly dictates otherwise. Finally, as used in the description herein and attachments hereto, the meanings of "and" and "or" include both the conjunctive and disjunctive and may be used interchangeably unless the context clearly dictates otherwise. Defined terms carry the stated definitions whether expressed as nouns, verbs, adjectives or any other grammatical variation, throughout the specification and claims.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Further, although process steps, method steps, systems or the like may be described in a sequential order, such processes, methods and systems may be configured to work in alternate orders. In other words, any sequence or order of steps that may be described does not necessarily indicate a requirement that the steps be performed in that order. The steps of processes described herein may be performed individually or in any order practical. Further, some steps may be performed simultaneously.

It will be readily apparent that the various methods and systems described herein may be implemented by, e.g., appropriately programmed General Purpose Computing Devices. Typically a processor (e.g., a microprocessor) will receive instructions from a memory or like device, and execute those instructions, thereby performing a process defined by those instructions. Further, sets of instructions that implement such methods and algorithms may be stored as programs and transmitted using a variety of known media.

The data exchange of certain embodiments of the present invention can be implemented in hardware, software or a combination thereof. In one exemplary embodiment, the data exchange is implemented in software or firmware that is stored in a memory or computer readable medium, and that is executed by a suitable instruction execution system. If implemented in hardware, as in an alternative embodiment, the data exchange can be implemented with any technology, which is known in the art.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor, and the like. Transmission media may include or convey acoustic waves, light waves and electromagnetic emissions, such as those generated during radio frequency (RF) and infrared (IR) data communications, or any other wireless form of communication. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Where databases are described, it will be understood by one of ordinary skill in the art that (i) alternative database structures to those described may be readily employed; (ii) other memory structures besides databases may be readily employed.

Devices that are in communication with each other need not be in continuous communication with each other, unless expressly specified otherwise. In addition, devices that are in communication with each other may communicate directly or indirectly through one or more intermediaries. Additionally, a description of an embodiment with several Components in communication with each other does not imply that all such Components are required. On the contrary a variety of optional Components are described to illustrate the wide variety of possible embodiments of the present invention.

Data Definitions
Anonymous Exchange I.D. Code—
  A unique identifier assigned by the Anonymous Exchange for each data record.
Consumer Information—
  Identification information, demographic information, financial information, and other information related to personally identifiable individuals.
Data Provider I.D. Code—
  A unique identifier assigned by the Anonymous Exchange for each Data Provider.
Database Key—
  Identification information for a particular database record or table, being a Foreign Key, Primary Key or the like, e.g. an Anonymous Exchange I.D. Code or Data Provider I.D. Code.
Foreign Data Key—
  A pointer on a particular record or a particular database structure, such as a table, which is a reference to a particular record or set of records on another particular database structure, on the same database or on a separate database.
Index—
  A set of Database Keys, each of which, or a combination of which, identifies a record, or set of records, located on a particular database in a particular structure on the database and referenced on the structure of the database by the particular key of the Index.
Legal Representations—
  A statement of a fact as of a certain time which may or may not have constraints on its duration and applicability, made by one party to another as a term of a particular Transaction, such that the party receiving the Legal Representation can contractually rely on it to take some action.
Primary Key—
  A database field used as the primary identifier for a particular record in a particular structure in a database.
Private Data—
  Information protected by law from public access.
Public Key Infrastructure—
  A method to protect data, principally using two keys, a public key that one disseminates to anyone for encrypting data or verifying digital signatures, and a private key that one uses to decrypt received data or to digitally sign data.
Query—
  A codified request for information from a database.
Record Type—
  A classification of a set of data elements, such as the classifications employment data, address data, and telephone data.
Registration Metric—
  A measurement of one registration criteria, such as business licensure or association membership.
Session Key—
  A key used to encrypt a bulk of data, such as during an email exchange or a World Wide Web connection.
Standard Data Format—
  A set of rules which defines the type, format and other meta-characteristics of sets of data.
System Definitions
Communications Network—
  A set of nodes which can transmit or receive messages over a communications medium using a standardized network protocol.
Communications Session—
  A connection over a Communications Network between mutually Authenticated Peers.
Component—
  Individual computing processes designed to perform a particular function or set of functions by receiving inputs of data and producing outputs of data.
Anonymous Exchange Database—
  A clearinghouse database for the storage of encrypted Indices and related data.
General Purpose Computing Device—
  A device comprising a processor, such as a microprocessor, that receives instructions from a memory device and executes those instructions, thereby performing a process defined by those instructions and producing an output of data.
Anonymous Exchange Software Application—
  A set of Components which permits the user of the Application to participate in an anonymous exchange of data.
  Connection Component—
    A computing process that manages connections with Communications Networks, users of Communications Networks and instances of software applications operating on a Communications Network.
  Encryption Interface—
    A computing process that provides security and privacy to transmissions by translating transmissions to and from a secret code, using, for example, a Public Key Infrastructure.
  File Transfer Component—
    A computing process that transmits and receives sets of data records stored in a memory device as a file.
  Kernel Component—
    A computing process that manages and connects other Components and engines.

Messaging Component—
A computing process that creates and distributes alerts, such as emails.
Registration Component—
A computing process that approves users for participation in the Anonymous Exchange based on pre-determined criteria.
Search Component—
A computing process that compares Queries to Indices to determine whether matching data exists.
Settlement Component—
A computing process that manages the accounting for successful Transactions based on the Record Type transmitted and the price associated with that Record Type.
User Interface—
A computing process with a graphical display to allow users to interact with the Anonymous Exchange.
Sandbox—
A secure and separate computing environment. A container, not accessible by the main exchange program or any user, within which private data can be decrypted and searched.
Settlement—
The process of the requesting party of a Transaction delivering the requisite payment to the responding party of a Transaction.
Transaction—
The process of one party requesting a particular set of data and another party delivering the particular set of data to the requesting party.
System Users Definitions
System Administrator—
Entity that initiates and maintains an instance of the Anonymous Exchange.
Data Buyer—
Entity, whose registration has been approved by the Anonymous Exchange, seeking to purchase Private Data from Data Providers that matches submitted Data Buyer Queries.
Data Provider—
Entity, whose registration has been approved by the Anonymous Exchange, seeking to earn revenue by selling Private Data to Data Buyers.

Those skilled in the art will also appreciate that the Anonymous Exchange of Private Data described represents only one example of the various configurations that will be suitable for implementation of the various embodiments of the invention. Accordingly, the scope of the present invention is described by the claims appended hereto and supported by the foregoing.

FIG. 1 depicts one exemplary embodiment of an Anonymous Exchange 106 shown communicating with a Data Provider 104 and a Data Buyer 108 over the Internet 102. In alternative embodiments, the Internet 102 may be any communication method or network.

The Data Provider 104 may be any entity storing Private Data, such as Consumer Information or other relevant data. For example, the Data Provider 104 may be a pizza delivery company that stores current Consumer Information. The Data Buyer 108 may be any entity seeking to purchase Consumer Information or other relevant data for a legally permissible purpose. For example, a collection agency may be collecting on behalf of a third party and have a legitimate business purpose, according to applicable laws and regulations, such as the Gramm-Leach-Bliley Act (GLBA), to access data that is provided by the Data Provider 104, the pizza delivery company. The Data Provider 104 and the Data Buyer 108 are System Users of the Anonymous Exchange 106 and need only utilize a General Purpose Computing Device to interact with the Anonymous Exchange 106 once their participation in the Anonymous Exchange 106 is approved.

The Anonymous Exchange 106 of this exemplary embodiment is a system comprised of at least one Anonymous Exchange Software Application having a plurality of functional Components, including a Search Component, a User Interface, an Encryption Interface and at least one Exchange Database. The additional functional Components may be a Registration Component, a Connection Component, a Messenger Component, a File Transfer Component and a Settlement Component, all managed by a Kernel Component. In alternative embodiments, the Anonymous Exchange 106 may comprise any other computing system or collection of systems that performs the functions of the present invention.

The Anonymous Exchange 106 interacts with the Data Providers 104 over a Communication Network such as the Internet 102, as discussed in more detail with reference to FIG. 2A. In this exemplary embodiment, all transmissions between the parties are encrypted using a Public Key Infrastructure, and the encryption of Communication Sessions is managed by the Communications Component and the Encryption Interface. In alternative embodiments, any encryption or method to maintain the privacy of the data may be utilized.

In this exemplary embodiment, each Data Provider 104 periodically submits an Index, of the data it is willing to sell on the Exchange 106, to the Anonymous Exchange 106. The Index contains the minimum critical elements of the private data, to allow for a search of available data records. In this exemplary embodiment, the Indices must conform to the rules, such as a Standard Data Format, provided by the Anonymous Exchange 106. The Anonymous Exchange 106 collects the encrypted Indices from each Data Provider 104 and creates encrypted, unique, searchable Index data records for each registered Data Buyer 108, as discussed in detail with reference to FIG. 5. In other words, the Anonymous Exchange 106 creates one Index for each Data Buyer 108, that has been created by combining, or compiling, all of the collected Indices from all of the Data Providers 104, and encrypting the resulting Index for that particular Data Buyer 108. The Anonymous Exchange 106 may receive an encrypted Query from a Data Buyer 108 and a Search Component may then compare it to the encrypted Index data records prepared for that Data Buyer 108 in a sand-box environment, as discussed in detail with reference to FIG. 6.

Figure 2A:
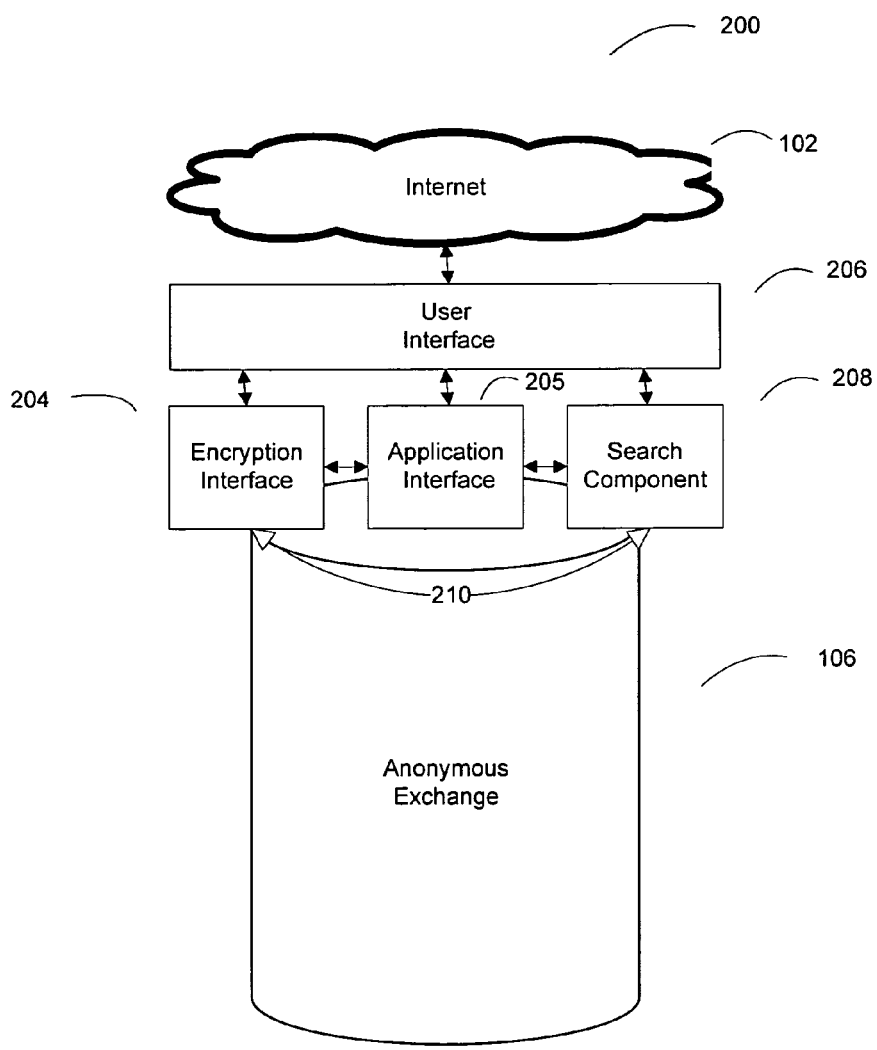
FIG. 2A is a context diagram further defining the Anonymous Exchange system of FIG. 1.

FIG. 2A depicts a context diagram 200 further defining the Anonymous Exchange 106 system of FIG. 1. A System User may communicate with the Anonymous Exchange 106 via the User Interface 206, and utilize the functions of the Encryption Interface 204, the Application Interface 205, and the Search Component 208. The User Interface 206 may be any standard graphical and textual interface to allow System Users to interact with the Anonymous Exchange 106. For example, a Registration form may be presented to the System Users via the User Interface 206 as a standard web site form with certain fields defined for user input. The Application Interface provides the basic functions of the Anonymous Exchange 106 to the System Users.

The Encryption Interface 204 receives an encrypted Index and related data from each Data Provider 104. The Encryption Interface 204 decrypts and re-encrypts transmissions from the Data Provider 104, in a one-way process for each Data Buyer 108, to ensure that neither the other System Users nor the Anonymous Exchange 106 have access to the underlying data. To initiate the one-way Index encryption process for each Data Buyer 108, the Encryption Interface 204 requests and receives the Public Keys of each registered Data Buyer 108 from the Anonymous Exchange and creates a unique, encrypted Index, or set of Index data records, for each registered Data Buyer 108. The Encryption Interface 204 aggregates all Indices from all applicable Data Providers 104, and saves a separate aggregate Index for each registered Data Buyer 108, encrypted specifically for that Data Buyer 108.

The Anonymous Exchange 106 labels each data record of each encrypted Index with a Data Provider 104 I.D. Code, as created by the Exchange by looking up the Data Provider's I.D. Code on the Anonymous Exchange 106 database, based on the digital signature submitted by the Data Provider 104; the Foreign Data Key, as provided by the Data Provider 104; a unique Primary Key generated by the Anonymous Exchange 106; and a Data Buyer group key, retrieved from the Anonymous Exchange 106 database, identifying the Data Buyer 108, or group of Data Buyers 108 for which the encrypted Index was created. The Anonymous Exchange 106 can create multiple sets of these aggregated Indices, each one encrypted for a specific Data Buyer 108 or group of Data Buyers 108. These sets of Indices may be updated periodically or with the addition of each new Data Provider 104. In alternative embodiments, the Exchange may create specialized Indices for subsets of Data Buyers 108, or create separate Indices based on each separate Data Provider 104.

The Search Component 208 receives a Query signed by the Data Buyer's Private Key from a Data Buyer, and retrieves the encrypted Index data records created for that Data Buyer through the Encryption Interface 204. The Search Component 208 then decrypts the Index data records with that Data Buyer's Private Key and compares the Query to the Index data records within the secure, Sandbox environment of the Search Component 208. The Private Data is decrypted within the Search Component's 208 Sandbox container, so that no user or program can access the decrypted Private Data. If matching data is found, the Data Buyer is notified of the Record Type, related costs, and the Anonymous Exchange I.D. Code for the matching records, as will be discussed in detail with reference to FIGS. 6 and 7.

Figure 2B:
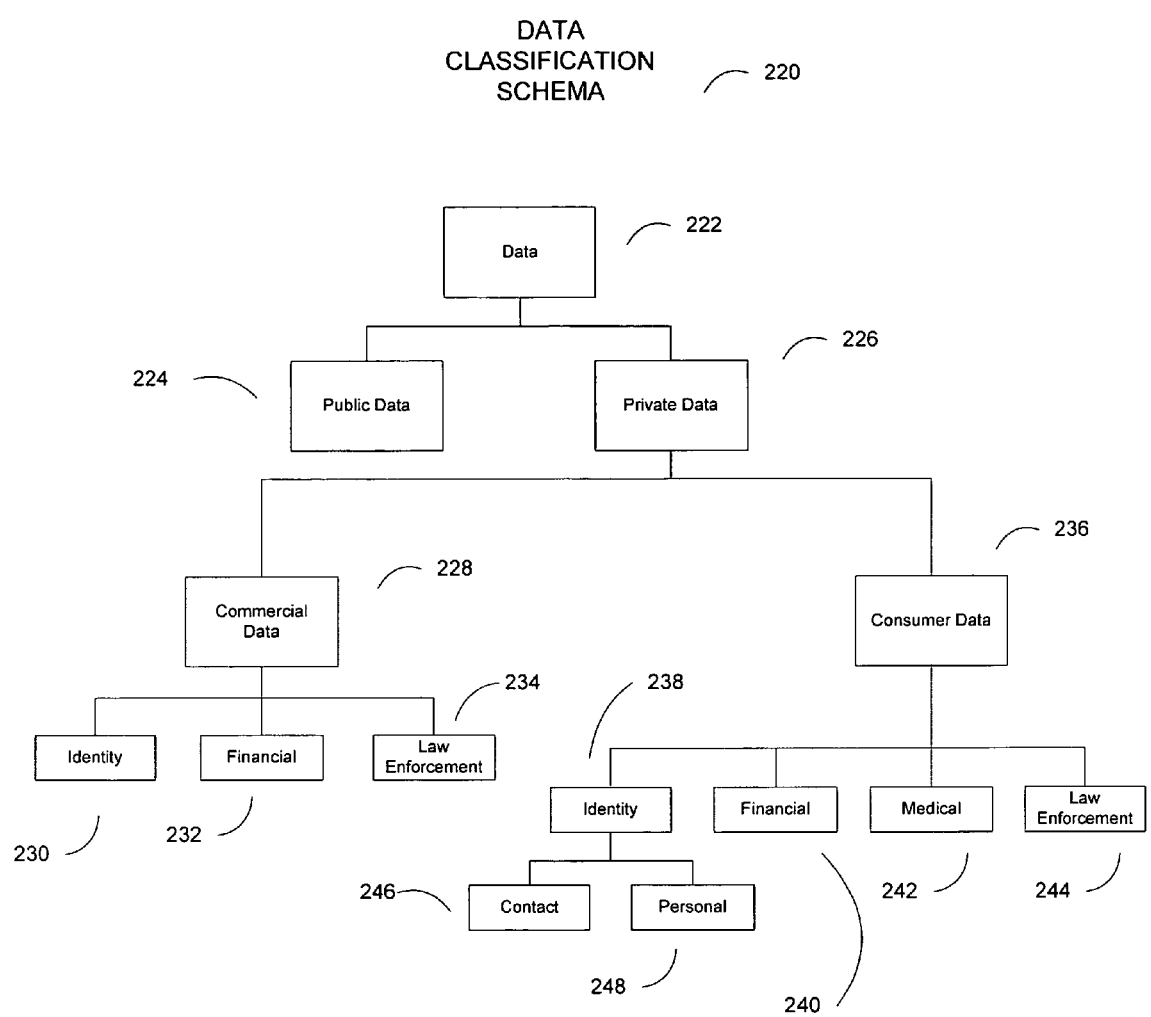
FIG. 2B is a hierarchical chart of the data classification schema for Private Data.

FIG. 2B presents the data classification schema 220 for Private Data 226. The general classification of data 222, as utilized by the present invention, is broken into public data 224 and Private Data 226. Private Data 226 is defined as data that is protected by law from public access. The present invention facilitates the on-line exchange of Private Data 226 in a manner that allows Data Buyers and Data Providers to comply with the applicable laws and regulations that protect the Private Data 226.

Private Data 226 is then broken into commercial data 228, being data concerning business entities, and consumer data 236, being data about individual consumers. Consumer data 236, commonly referred to as Consumer Information, may be broken into at least four sub-categories, identity 238, financial 240, medical 242 and law enforcement 244. Identity data 238 may be further broken into contact data 246, being contact information such as address and telephone numbers, and personal data 248, being data to identify the exact individual, such as a social security number. Financial data 240 may include mortgage history, loan history and credit status. Medical data may include age, insurance policies, doctors' names and medical history. Law enforcement data may include driver's license numbers and criminal report history. The present invention deals with the exchange of Private Data 226, and exemplary embodiments are disclosed herein within the context of the exchange of Consumer Data 236.

FIG. 3 depicts a process diagram 300 for an exemplary embodiment of the present invention. As in the example of FIG. 1, the Data Provider 104 and the Data Buyer 108 of FIG. 3 have both registered with the Anonymous Exchange 106, as will be discussed in detail with reference to FIG. 4. To begin the depicted process, the registered Data Provider 104 transmits in step 301 an Index of its available Private Data, which in this exemplary embodiment is Consumer Information.

This transmission of the Index is encrypted with a Session Key, and the Session Key is encrypted with the Public Key of the Anonymous Exchange for each Communications Session. In addition, the Index is digitally signed with the Data Provider's Private Key, and labeled with the Data Provider's Foreign Data Key. The Anonymous Exchange 106 collects such Indices, via an Encryption Interface, from all registered Data Providers 104 and creates an encrypted Index, comprising a set of data records for each Data Buyer 108, and encrypted with that Data Buyer's Public Key. To each data record, the Anonymous Exchange 106 appends a plain-text Anonymous Exchange I.D. Code, and attaches the related Data Provider's I.D. Code, Data Provider's Foreign Data Key and the Data Buyer's Group Key. The Anonymous Exchange 106 unique I.D. Code ensures that the Data Provider's identity is not viewable to any entity other than the Anonymous Exchange. The Anonymous Exchange never views or has access to the underlying Consumer Information, or Indices thereof.

When a Data Buyer 108 is seeking Consumer Information, the Data Buyer 108 submits in step 302 a Query related to a particular individual or particular entity. The Data Buyer 108 may enter the Query manually into the User Interface of the Exchange 106, or upload a batch Query into the User Interface. The Query 302 includes known identifying data associated with the identity of an individual or entity, such as the Name and Social Security Number of the individual, and a request for certain related data, such as a telephone number, email address, geographic location, residential address or business address. In this exemplary embodiment, the preferred format for the Query has at least two data fields, with at least one identifying data field and at least one data request field. In alternative embodiments, a batch Query may be transmitted through alternative interfaces, such as an FTP server, a web service or the like.

The transmitted Query may be encrypted with a Session Key, transmitted with the Session Key encrypted with the Public Key of the Exchange 106, and digitally signed with the Private Key of the Data Buyer 108. The transmitted Query 302 may also contain the required Legal Representation. In alternative embodiments, the Legal Representation may be required during the Registration process, or at any other stage of the present invention.

The Legal Representation is a written agreement, in electronic format, whereby the parties contractually agree to a legally permissible purpose for the use of Private Data. For example, the Data Buyer 108 may be a collection agency that is seeking information to collect on an account, which may be legally permissible pursuant to applicable laws and regulations, such as the Gramm-Leach-Bliley Act, or other rules concerning the exchange of consumer or commercial information, other private data or the like.

In this exemplary embodiment, the Anonymous Exchange 106 forwards the Query to the internal Search Component. The Data Buyer 108 must log in step 302 to the Anonymous Exchange 106, and present the Data Buyer's Private Key to the Search Component of the Anonymous Exchange 106. The Search Component acts as a secure Sandbox, to process the functions of decryption and comparison in a separate and private environment. That Private Key allows the Search Component to decrypt the aggregated Index records that have been created for that particular Data Buyer 108. Within the Search Component, the Query will be compared to the decrypted Index. In alternative embodiments, any data comparison process that maintains data privacy may be utilized that reveals matching data and alerts a Data Buyer 108. For example, the comparison of the Query to an Index may be processed by a third party, to maintain anonymity. A third party system may retrieve a new Query, retrieve the aggregate Index corresponding to that Data Buyer, receive that Data Buyer's Private Key to decrypt the Index, decrypt the Index and compare the Query to the Index. The third party system may then transmit the results of the comparison to the Exchange System. In other alternative embodiments, the Query may be compared to each separate Index from each registered Data Provider.

Referring still to FIG. 3, if the Search Component finds at least one match to the Query, the Messaging Component of the Exchange 106 sends in step 303 a "Match Found" message to the Data Buyer 108. The "Match Found" message may include a listing of the Record Type, the cost of the data and the identifying Anonymous Exchange I.D. Code, for each matching record. If multiple matches are found, other identifying information, such as creation date or type of Data Provider, may allow the Data Buyer 108 to choose the most recent or most reliable set of data. The identity of the Data Provider 104 is never revealed to any Data Buyer 108. If the Data Buyer's 108 query is too broad, a large number of matches may be returned and the Data Buyer 108 will have many more matches to review, if not purchasing all.

If the Data Buyer 108 wishes to purchase all or one of the sets of matching data, the Data Buyer 108 transmits in step 304 a message to the Anonymous Exchange 106, stating which data is desired for purchase, identifying the data records by the Anonymous Exchange unique I.D. Code. In alternative embodiments, the System may provide a User Interface screen allowing a Data Buyer 108 to sort and view all matches, in order to choose exactly which records to purchase.

The Exchange 106 transmits in step 305 a data request to the correct Data Provider 104, based on the Data Provider I.D. Codes. The request includes the Data Provider's Foreign Data Key; and is encrypted with a Session Key, transmitted with the Session Key encrypted with the Data Provider's Public Key, and digitally signed with the Anonymous Exchange's Private Key. The Data Provider 104 is also provided in step 305 with proof of a legally binding contract, or Legal Representations, ensuring that the Data Buyer 108 has agreed to a legally permissible use of the data.

The Data Provider 104 may submit in step 306 the requested data to the Encryption Interface of the Anonymous Exchange 106. The submitted data is encrypted with a Session Key, transmitted with the Session Key encrypted with the Anonymous Exchange's Public Key, and digitally signed with the Data Provider's Private Key. In alternative embodiments, the data transaction may be secured with a new pair of keys, generated for each new Transaction. For example, the Anonymous Exchange 106 may generate the new pair of keys, and transmit the Public Key to the Data Provider 104 and transmit the Private Key to the Data Buyer 108. The Data Provider 104 may then encrypt the data transmission for that particular Data Buyer 108 for that particular Transaction, and the Anonymous Exchange 106 never has access to the confidential data.

The Anonymous Exchange 106 transmits in step 308 a payment request to the Data Buyer 108. The Data Buyer 108 transmits in step 309 a payment to the Anonymous Exchange 106. The Anonymous Exchange 106, acting as an escrow agent in the exchange of data and monies, transmits in step 310 the payment, less the Anonymous Exchange 106 fee, to the Data Provider 104; and transmits in step 312 the requested data to the Data Buyer 108. The Encryption Interface may decrypt the data and re-encrypt the data before the File Transfer Component of the Anonymous Exchange 106 transmits in step 308 the encrypted data to the Data Buyer 108. In additional alternative embodiments, the Encryption Interface could be an entirely separate, third-party entity.

Figure 4:
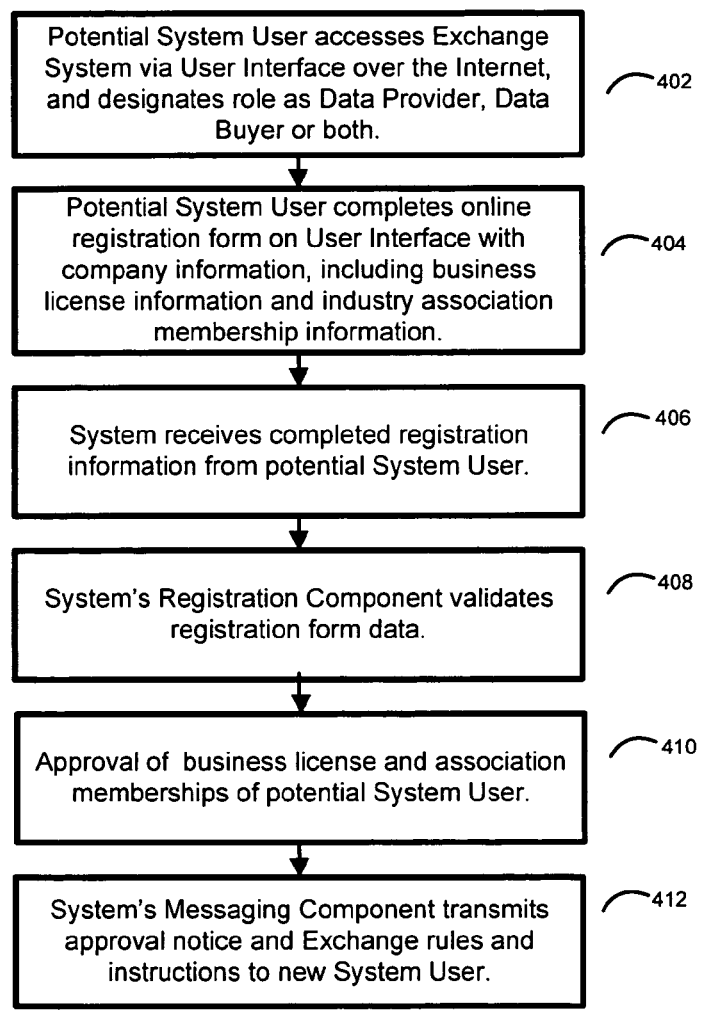
FIG. 4 is a workflow diagram for a "Registration Procedure" of an exemplary embodiment of the present invention.

FIGS. 4-7 are workflow diagrams that illustrate on-line operations from the view of the Anonymous Exchange. FIG. 4 depicts a workflow diagram 400 for a "Registration Procedure" of an exemplary embodiment of the present invention. A potential System User accesses in step 402 the Anonymous Exchange via a User Interface over a Communications Network, such as the Internet. From the User Interface, the potential System User designates in step 402 their desired role(s) as a Data Provider, a Data Buyer or both. The Anonymous Exchange's User Interface may be a graphical and textual web site page or any other portal to allow interaction with the Anonymous Exchange.

The Potential System User completes in step 404 an on-line registration form presented on the User Interface. The Potential System User enters 404 such Registration Metrics as company name, type of company, business license information and industry association membership information. The Anonymous Exchange collects the Registration Metrics to verify the identity of the System User and to validate their type of company and purposes for seeking the information. For example, the Registration Metrics may be business license and industry association membership information. Such Registration Metrics allow the Exchange to evaluate a potential System User within a framework designed to ensure only valid, licensed businesses within a certain set of industries are participating in the Exchange.

The Anonymous Exchange receives in step 406 the completed registration information, and the System's Registration Component validates in step 408 the submitted Registration Metrics. In alternative embodiments, the validation may be performed by a third party or by another Component of the Anonymous Exchange. If all registration form data is validated, the Registration Component approves in step 410 the registration of the System User. The Messaging Component of the System transmits in step 412 an approval notice, along with the Exchange rules and instructions, to the new System User. The notice may be a standard email message, a message within the Exchange's User Interface, or any other form of notice to a System User.

Figure 5:
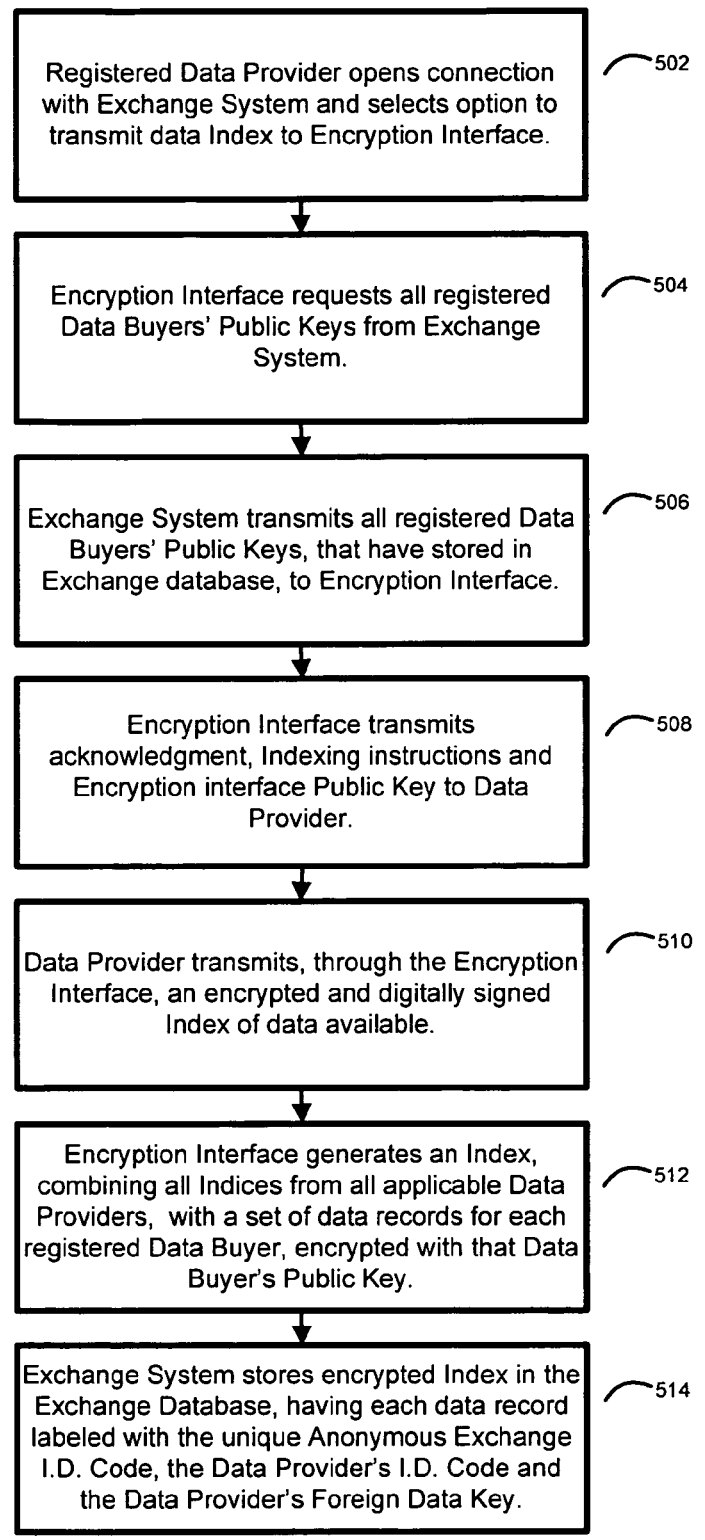
FIG. 5 is a workflow diagram for a "Creation of Encrypted Indices" process of an exemplary embodiment of the present invention.

FIG. 5 depicts a workflow diagram 500 for a "Creation of Encrypted Indices" process of an exemplary embodiment of the present invention. In order to participate in the Anonymous Exchange, all potential Data Providers must create an Index of their available data, pursuant to the rules of the Exchange. A Data Provider's transmission of the Index to the Anonymous Exchange 106 is encrypted with a Session Key, and the Session Key is encrypted with the Public Key of the Anonymous Exchange for each Communications Session. In addition, the Index is digitally signed with the Data Provider's Private Key, and labeled with the Data Provider's Foreign Data Key. The Anonymous Exchange 106 collects such Indices, via an Encryption Interface, from all registered Data Providers 104 and creates an encrypted Index, comprising a set of data records for each Data Buyer 108, and encrypted with that Data Buyer's Public Key. To each data record, the Anonymous Exchange 106 appends a plain-text Anonymous Exchange I.D. Code, and attaches the related Data Provider's I.D. Code, Data Provider's Foreign Data Key and the Data Buyer's Group Key. The Anonymous Exchange 106 unique I.D. Code ensures that the Data Provider's identity is not viewable to any entity other than the Anonymous Exchange. As a result of the encryption scheme, the Anonymous Exchange 106 never views or has access to the underlying Consumer Information, or Indices thereof.

Referring now to FIG. 5, a registered Data Provider opens in step 502 a connection with the Anonymous Exchange and selects in step 502 the option to transmit a data Index to the Encryption Interface. The Index is a summary data set, listed by Record Type and key data fields, such as name, city and state, which represent the data available in the Data Provider's underlying database. The transmission in step 502 of an Index is encrypted with a Session Key, transmitted with the Session Key encrypted with Exchange's Public Key, and digitally signed with the Data Provider's Private Key. The Exchange will label each data record in the Index with a unique Anonymous Exchange I. D. Code, the Data Provider's I.D. Code, the Data Provider's Foreign Data Key, and the Data Buyer's Group Key.

The Index may be based upon an industry Standard Data Format, such as the Metro II format for debt account information transmitted to and from credit reporting agencies. Having a known standard format may facilitate the Index creation process for Data Providers. The Index may include data such as the creation date or last update date to show the age of a record set, in addition to identifying information, such as name, social security number, address and telephone number. Alternatively, a "Record Type" flag may be appended to the Index records. In alternative embodiments, the Index may be any specified set of data records that would allow sorting and identification.

Figure 6:
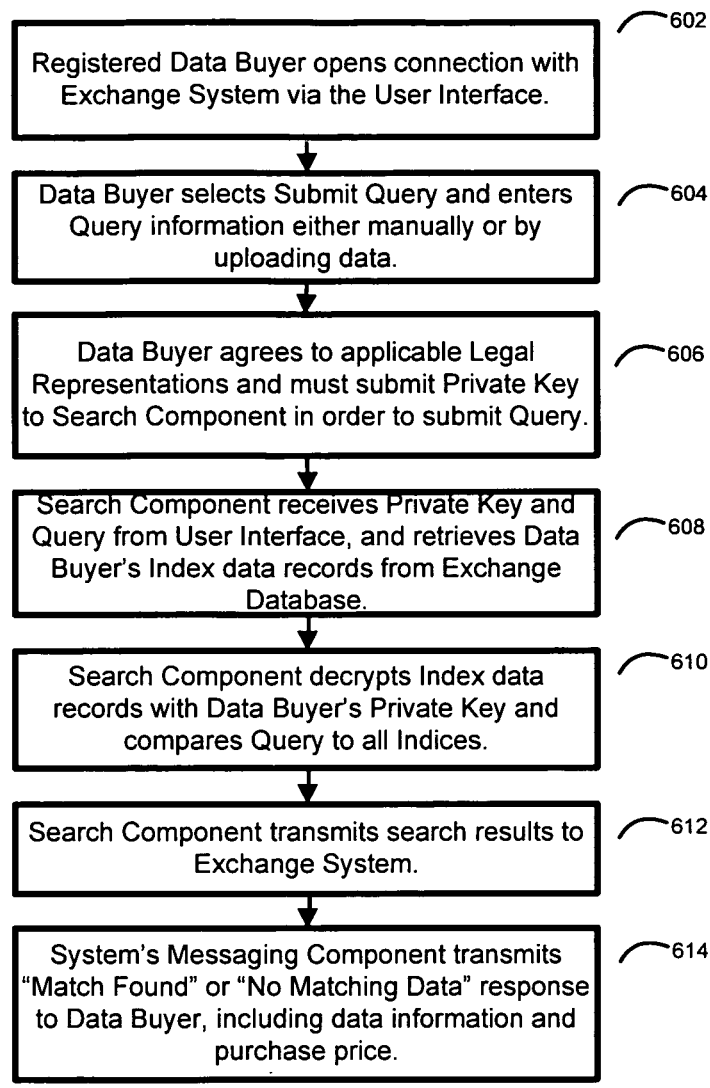
FIG. 6 is a workflow diagram for a "Querying Indices" process of an exemplary embodiment of the present invention.

FIG. 6 depicts a workflow diagram 600 for a "Querying Indices" process of an exemplary embodiment of the present invention. A registered Data Buyer opens in step 602 a connection over the Internet with the Anonymous Exchange's User Interface. The Data Buyer selects "Submit Query" on the Interface and enters in step 604 the required Query information presented to the User as a web site form page. The User may choose in step 604 to enter the Query details manually or upload data from their own database. The Query data is some selection of information, such as on a consumer or an account, with critical missing data being sought by the Data Buyer. For example, the Data Buyer may be collecting on a credit card account for which it does not have a correct address or telephone number. The Data Buyer enters the name or Social Security Number of the consumer, requesting the contact information in the Query.

In order to submit in step 606 the Query, the Data Buyer logs into the Anonymous Exchange, submits the Data Buyer's Private Key to the Search Component, and agrees to the applicable Legal Representations. The Legal Representations, in this exemplary embodiment, are a legally binding agreement to a set of stated permissible uses of the Private Data, pursuant to a set of applicable laws and regulations.

The Search Component receives in step 608 the Data Buyer's Private Key and the Query information and retrieves in step 608 the unique Index records, from the Exchange Database, which have been created and encrypted for that Data Buyer by the Exchange Encryption Interface. The Search Component acts as a sand box, wherein secure processes can run in a separate environment, so that decrypted Private Data may not be accessed by any user or program. The Search Component decrypts in step 610 the Index records with the Data Buyer's Private Key, within the secure, Sandbox environment of the Search Component. To protect the data, the Index may only be decrypted within the Search Component, and not accessible by any party or any system The Search Component compares in step 610 the Query to the Index records. Each data element of the query is compared to each element of the Index. For example, the Search Component may use the name and address of the Query to search the Index for a match. In alternative embodiments, the Search Component could search only a portion of the Index, or only selected or flagged files. For example, only files with a creation date within a certain time period would be returned to the Search Component.

The Search Component transmits in step 612 the search results to the Messaging Component of the Anonymous Exchange. The Messaging Component, which may be within the secure, Sandbox environment of the Search Component, transmits in step 614 either a "Match Found" or "No Matching Data" message to the Data Buyer. The "Match Found" message may contain information about the Record Type, the Anonymous Exchange I.D. code for each record, and the cost of purchasing the data. If multiple matches are found, other identifying information, such as creation date or type of Data Provider, may allow the Data Buyer 108 to choose the most recent or most reliable set of data. If the Data Buyer's 108 query is too broad, a large number of matches may be returned and the Data Buyer 108 will have many more matches to review, if not purchasing all. The identity of the Data Provider 104 is never revealed to any Data Buyer 108.

In alternative embodiments, an encrypted Query may be delivered directly to the Data Provider for comparison to their database, or the comparison could be processed by a third party, as discussed with reference to FIG. 3.

Figure 7:
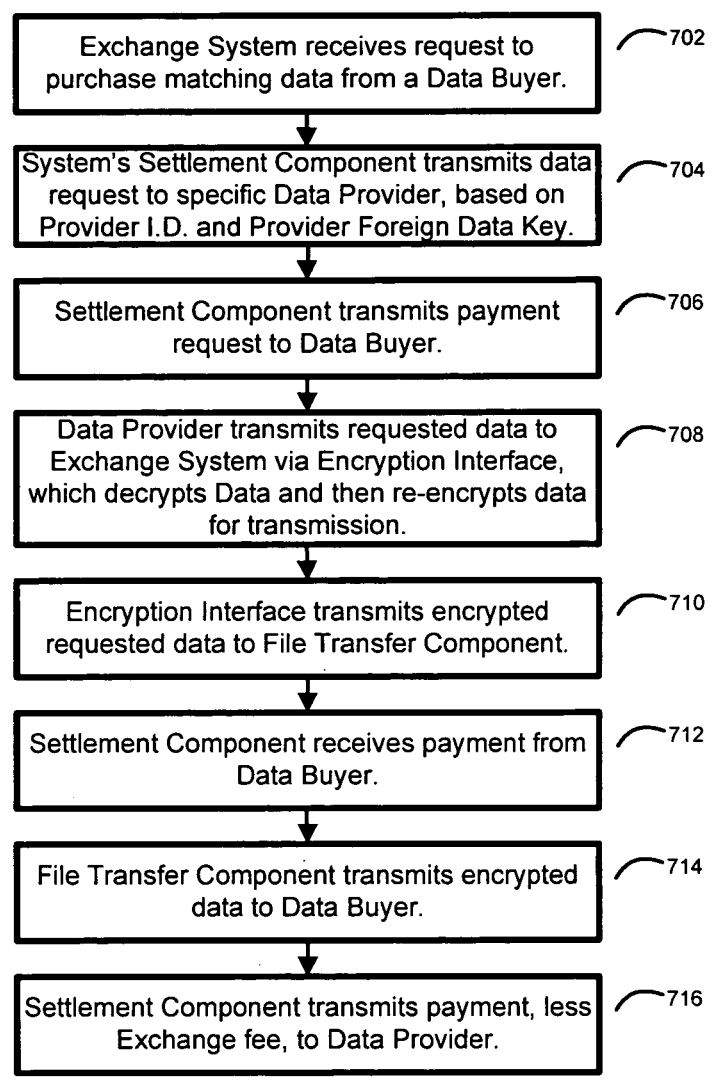
FIG. 7 is a workflow diagram for a "Transferring Data and Settlement" process of an exemplary embodiment of the present invention.

FIG. 7 depicts a workflow diagram 700 for a "Transferring Data and Settlement" process of an exemplary embodiment of the present invention. If a Data Buyer desires to purchase data matching a Query sent to the Anonymous Exchange, the System receives in step 702 a request to purchase from that Data Buyer, identifying the desired records by the unique Anonymous Exchange I.D. Code. The System's Settlement Component transmits in step 704 a data request to the Data Provider, based on the Data Provider I.D. Code, related to that Anonymous Exchange I.D. Code, and including the Data Provider Foreign Data Key related to that Anonymous Exchange I.D. Code. The Data Buyer never receives the Data Provider I.D. Code or the Data Provider Foreign Data Key. The Settlement Component transmits in step 706 a payment request to the Data Buyer. Therefore, the Anonymous Exchange is acting as an escrow agent in the exchange of data and monies.

The Data Provider transmits in step 708 the requested data to the Anonymous Exchange via the Encryption Interface, encrypted with a Session Key, transmitted with the Session Key encrypted with the Anonymous Exchange's Public Key, and digitally signed with the Data Provider's Private Key. The Encryption Interface decrypts the data and re-encrypts with the Data Buyer's Public Key, in a one-way process. The Exchange never has access to the unencrypted data and the Data Buyer never knows the identity of any Data Provider. In alternative embodiments, the Data Provider may transmit the data to the Data Buyer directly, through a peer-to-peer network, or via a third party. In these embodiments, the private data would never cross the border of the Anonymous Exchange System. For example, in a direct transfer of data, anonymity may be retained by the use of an anonymous remailer over the Internet. Alternatively, as in the case of utilizing a peer-to-peer network, the Anonymous Exchange may issue two one-time key pairs, to allow the Data Provider to both digitally sign the data transmission and encrypt the data with the new one-time Public Key of the intended Data Buyer. This would allow the transmission to be sent to a file sharing network, such as the BitTorrent® network of peers, where the Data Provider could upload the data, as identified by the one-time key, and never be in direct contact with the Data Buyer. The Anonymous Exchange would serve only to generate and transmit key pairs and to transmit the requisite torrent file.

The Encryption Interface transmits in step 710 the requested data to the File Transfer Component. The Settlement Component receives in step 712 the payment from the Data Buyer. The File Transfer Component transmits in step 714 the data to the Data Buyer, encrypted with a Session Key, transmitted with the Session Key encrypted with the Data Buyer's Public Key, and digitally signed with the Exchange's Private Key. As with many email systems known in the art, the encryption, decryption and digital signatures may be handled automatically by the systems and may need no manual intervention by the System Users. In alternative embodiments, the payment process may be handled completely or partially by a third-party entity and any form of acceptable payment may be transferred.

The Anonymous Exchange's Settlement Component transmits in step 716 a payment to the Data Provider, less the Anonymous Exchange's fee. The Anonymous Exchange may wait for a confirmation of receipt of data from the Data Buyer before transmitting the payment to the Data Provider.

Figure 8:
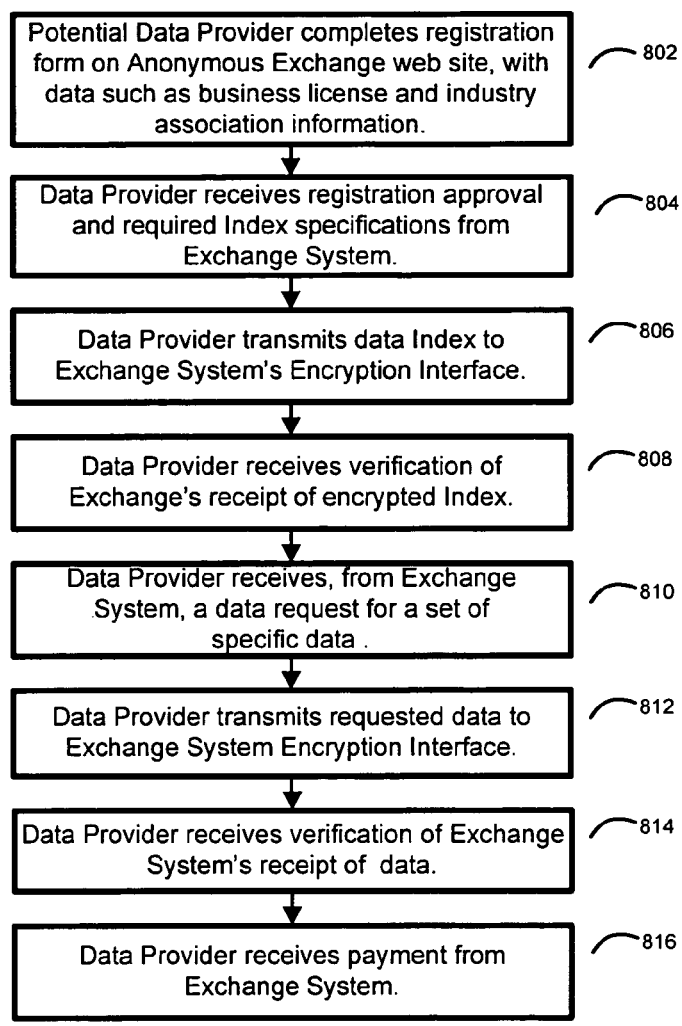
FIG. 8 is a workflow diagram for a "Selling Data" process of an exemplary embodiment of the present invention.

FIGS. 8 and 9 are workflow diagrams illustrating on-line operations from the point of view of System Users. FIG. 8 depicts a workflow diagram 800 for a "Selling Data" process of an exemplary embodiment of the present invention. A potential Data Provider, such as an on-line music store, completes in step 802 the registration from on the Exchange web site, with the Registration Metrics such as business license and industry association information. As discussed with reference to FIG. 4, the Anonymous Exchange may require verification of the Registration Metrics to approve registration.

If approved by the Anonymous Exchange, the Data Provider receives in step 804 a notice of registration approval along with specifications for the Index and other Exchange instructions. For example, the Data Provider will receive exact parameters and Standard Data Format required for a submitted Index and instructions on encrypting transmissions and submitting to the Encryption Interface. Based on this information, the Data Provider may transmit in step 806 a data Index to the Anonymous Exchange's Encryption Interface. In this exemplary embodiment, the Index is encrypted with a Session Key, transmitted with the Session Key encrypted with the Exchange's Public Key, and digitally signed with the Data Provider's Private Key. The Anonymous Exchange labels each record in the Index with the corresponding Data Providers I.D. Code, the Data Provider's Foreign Data Key in plain text, and the Anonymous Exchange I.D. Code.

The Data Provider receives in step 808 verification of the Exchange's receipt of the encrypted Index. If a Data Buyer requests that Data Provider's data from the Exchange, as identified by the Data Buyer to the Anonymous Exchange using the Anonymous Exchange I.D. Code related to the corresponding Data Provider I.D. Code and the Data Provider's Foreign Data Key, that Data Provider receives in step 810, from the Anonymous Exchange, a data request for a set of specific data. The data request includes details such as the Data Provider's Foreign Data Key, to enable the Data Provider to look up the appropriate record on its database.

The Data Provider locates and transmits in step 812 the requested data to the Anonymous Exchange's Encryption Interface. The data is encrypted with the a Session Key, transmitted with the Session Key encrypted with the Exchange's Public Key, and digitally signed with the Data Provider's Private Key.

The Data Provider receives in step 814 verification of the Anonymous Exchange's receipt of the requested data. The Data Provider receives in step 816 a payment from the Anonymous Exchange for the data. The payment received in step 816 by the Data Provider may be the amount of payment paid by the Data Buyer less the Transaction fee amount retained by the Anonymous Exchange. The Data Buyer may be any entity that has a legitimate, business purpose for seeking the Private Data, such as an insurance company or law enforcement agency.

FIG. 9 depicts a workflow diagram 900 for a "Purchasing Data" process of an exemplary embodiment of the present invention. A potential Data Buyer registers in step 902 on the Anonymous Exchange web site by submitting the requisite Registration Metrics, such as business license and industry association information. After the approval process within the Anonymous Exchange, the Data Buyer receives in step 904 the registration approval from the Anonymous Exchange. The Data Buyer may then create in step 906 a Query, by either manually entering or uploading Query parameters to the Anonymous Exchange's User Interface. The Query parameters include at least one identifying data record, such as a consumer's name, and at least one requested data field, such as a request for a current residence address.

The Data Buyer also logs into in step 908 the Search Component of the Anonymous Exchange and transmits the Data Buyer's Private Key and agrees in step 908 to certain Legal Representations in order to submit the Query. The submission of the Private Key to the Search Component, allows the Search Component to retrieve and decrypt the Index records that have been created for that particular Data Buyer. The Legal Representations constitute statements by the Data Buyer as to the business of the Data Buyer and the intended use of the purchased data, so as to comply with a set of applicable laws and regulations. For example, the Data Buyer may affirm that it is a collections agency and will use the data to collect accounts in a legal manner. The agreement in step 908 to the Legal Representations becomes a legal and binding agreement of the Data Buyer.

The Data Buyer may receive in step 910 a "Match Found" response from the Anonymous Exchange, including the Anonymous Exchange I.D. Code for each record, the Record Type, the record creation date and the cost of purchasing each matching data record. If the Data Buyer decides to purchase all or part of the matching data records, the Data Buyer transmits in step 912 a data request to the Anonymous Exchange, identifying each desired record by the Anonymous Exchange I.D. Code. The Data Buyer receives in step 914 a payment request from the Anonymous Exchange and transmits in step 916 the payment to the Anonymous Exchange. The Data Buyer receives the requested data from the Anonymous Exchange, encrypted with a Session Key, transmitted with the Session Key encrypted with the Data Buyer's Public Key, and digitally signed with the Exchange's Private Key. Therefore, the Data Buyer has located and received the information it needs to conduct its business, by purchasing data from a source that may not have been available without the present invention.

In view of the foregoing, it will be understood that one aspect of the present invention comprises a computer-implemented method for exchanging Private Data. An on-line exchange builds an Index providing an identifier identifying each Data Provider operating as a source of the Private Data and defining each type of the Private Data maintained in local storage by that Data Provider. This on-line exchange can maintain in storage each Index while local storage controlled by each Data Provider maintains the Private Data. One or more Data Buyers, each operating as a purchaser of the Private Data, can transmit an encrypted Query to the Anonymous Exchange. This Query provides an identifier for the Data Buyer and defines a request for at least a selected portion of the Private Data. In response to an encrypted Query, the on-line exchange can complete a matching operation by comparing the Query transmitted by one of the Data Buyers to each Index maintained by the Anonymous Exchange. In the event of a match resulting from the matching operation, the on-line exchange can arrange for at least one of the Data Providers associated with the match and the Data Buyer associated with the Query to exchange the selected portion of the Private Data. This data exchange is achieved by the on-line exchange while maintaining both the anonymity of the at least one Data Provider and the Data Buyer and the security of the Private Data.

Another aspect of the present invention comprises a computer-implemented method for exchanging Private Data based on the operation of an on-line exchange. The on-line exchange can receive a Query from a Data Buyer that is typically carried via the Internet. The Query provides an unique identifier for the Data Buyer and defines a request for a selected portion of the consumer data, or Consumer Information. Each Data Buyer consents to a Legal Representation governing the terms of use for the consumer data. In response to the Query, the on-line exchange can complete a matching operation by comparing the Query issued by the Data Buyer to each Index maintained by the Anonymous Exchange. Each Index provides an identifier identifying the corresponding Data Provider and defines each type of the consumer data available from and maintained by the Data Provider. In the event of a match resulting from the matching operation, the on-line exchange manages a data exchange operation for at least one of the Data Providers associated with the match and the Data Buyer associated with the Query. This data exchange operation supports a secure exchange of the selected portion of the consumer data while maintaining the anonymity of each Data Provider and the Data Buyer.

For yet another aspect of the invention, a computer-implemented system is operative for exchanging consumer data among a Data Buyer computers associated with Data Buyers seeking to purchase items of consumer data and Data Provider computers having a local store comprising at least a portion of consumer data. An on-line exchange, coupled to the Data Buyer computers and the Data Provider computers via a distributed computer network, such as the Internet, responds to a Query by conducting a matching operation. In particular, the on-line exchange compares the Query issued to each Index maintained by the exchange. The Query typically comprises a unique identifier identifying one of the Data Buyer computers and defining a request to purchase one or more items of the consumer data. The Index typically provides an identifier identifying the Data Provider computer and defines each type of the consumer data available at the Data Provider computer. In response to a match resulting from the matching operation, the on-line exchange can manage a data exchange operation among the Data Provider computer associated with the match and the Data Buyer computer associated with the Query. This supports an exchange of one or more items of the consumer data while maintaining the anonymity of the Data Provider computer and the Data Buyer computer and preserving the secure nature of the consumer data items.

Another aspect of the invention comprises a computer-implemented method for exchanging private data. An on-line exchange registers Data Providers and Data Buyers, where the Data Providers register to operate as sources of the Private Data and the Data Buyers register to operate as purchasers of the Private Data in a manner consistent with legal requirements for obtaining the Private Data. For each registered Data Provider, the on-line exchange builds an encrypted Index providing an identifier identifying the registered Data Provider and defining each type of the Private Data available from the registered Data Provider. The on-line exchange typically maintains in storage each encrypted Index while local storage controlled by the registered Data Provider is used for storage of the Private Data.

In response to an encrypted Query transmitted from one of the registered Data Buyers, the on-line exchange can complete a matching operation by comparing the Query to each Index maintained by the exchange. The encrypted Query provides an identifier for the registered Data Buyer and defines a request for a selected portion of the Private Data. This matching operation is typically completed within a Sandbox environment of a Search Component of the on-line exchange. The use of a processing environment that is separate from all other processing activities of the on-line exchange supports secure processing of the Query and each Index.

In the event of a match signifying that one of the registered Data Providers maintains the selected portion of the Private Data, the on-line exchange can transmit a message to the registered Data Buyer associated with the Query. This message typically comprises information about the selected portion of the Private Data, the cost of purchasing the selected portion of the Private Data, and an Anonymous Exchange I.D. Code for uniquely identifying the selected portion of the Private Data.

The on-line exchange can receive a request to purchase from the registered Data Buyer associated with the Query, the purchase request confirming a purchase of the selected portion of the Private Data and comprising the Anonymous Exchange I.D. Code. In response to the purchase request, the on-line exchange can transmit a data request to the registered Data Providers, the data request comprising a Foreign Data Key to identify the selected portion of the Private Data. In response to a decision by a registered Data Provider to provide the selected portion of the Private Data, the on-line exchange coordinates delivery of selected portion of the Private Data from the registered Data Provider to the registered Data Buyer. In addition, the on-line exchange can arrange for delivery of a payment for the purchase of the selected portion of the Private Data from the registered Data Buyer to the registered Data Provider. In essence, the on-line exchange can be viewed as an escrow agent in the secure exchange of the selected portion of the Private Data while maintaining the anonymity of the registered Data Provider and the registered Data Buyer.

Yet another aspect of the invention comprises a computer-implemented method for exchanging Private Data comprising at least a portion of consumer data. Data Providers and Data Buyers register at an on-line exchange. The Data Providers register to operate as sources of the Private Data, while the Data Buyers register to operate as purchasers of the Private Data in a manner consistent with legal requirements for obtaining the Private Data. For each registered Data Provider, the on-line exchange builds an encrypted Index providing an identifier identifying the registered Data Provider and defining each type of the Private Data available from the registered Data Provider. The on-line exchange maintains in storage each encrypted Index while a local storage device associated with a registered Data Provider maintains the Private Data of that registered Data Provider.

The on-line exchange can receive an encrypted Query transmitted from one of the registered Data Buyers, typically via the Internet. This encrypted Query provides an identifier for the registered Data Buyer and defines a request for a selected portion of the Private Data. In response to the encrypted Query, the on-line exchange completes a matching operation by comparing the Query transmitted by one of the registered Data Buyers to each Index maintained by the on-line exchange. This matching operation is typically completed in a Sandbox environment of a Search Component associated with the on-line exchange to support secure and independent processing of the Query and each Index.

In the event of a match signifying that one of the registered Data Providers maintains the selected portion of the Private Data desired by one of the registered Data Buyers, the on-line exchange transmits a message to the registered Data Buyer associated with the Query. This message comprises information about the selected portion of the Private Data and an Anonymous Exchange I.D. Code for uniquely identifying the selected portion of the Private Data. In response to the message, the registered Data Buyer can transmit a request to purchase the selected portion of the Private Data, where the purchase request comprises the Anonymous Exchange I.D. Code. In response to the purchase request, the on-line exchange transmits a data request to the registered Data Provider having the selected portion of the Private Data. This data request represents an offer to purchase the selected portion of the Private Data and comprises a Foreign Data Key to identify the selected portion of the Private Data.

The on-line exchange receives the selected portion of the Private Data from the registered Data Provider and, in turn, forwards the selected portion of the Private Data from the on-line exchange to the registered Data Buyer. Significantly, the on-line exchange maintains in confidence the identity of the registered Data Provider and the identity the registered Data Buyer for this exchange of the Private Data. In addition, the on-line exchange can arrange for delivery of a payment for the purchase of the selected portion of the Private Data from the registered Data Buyer to the registered Data Provider.

In alternative embodiments, the on-line exchange represented by the Anonymous Exchange of the present invention may be embodied in multiple on-line entities or may be embodied fully or partially in software that is distributed to the Data Providers and Data Buyers. Additionally, the present invention may be implemented over any Communications Network, including telephonic or wireless systems.

In addition, alternative embodiments of the present invention may utilize any type of encryption or secure messaging processes, manual or automatic, internal or external, now known or to be invented, to ensure the data confidentiality and data integrity.

The present invention has been illustrated in relation to embodiments which are intended in all respects to be illustrative rather than restrictive. Those skilled in the art will recognize that the present invention is capable of many modifications and variations without departing from the scope of the invention.

Those skilled in the art will also appreciate that the system and method described represents only one example of the various configurations that will be suitable for implementation of the various embodiments of the invention. Accordingly, the scope of the present invention is described by the claims appended hereto and supported by the foregoing.

What is claimed is:

1. A computer-implemented method for exchanging private data, comprising the steps of: registering a plurality of data providers and a plurality of data buyers; building, by the computer, a searchable index for each of the data buyers based on at least one index of private data for sale provided from one or more of the data providers; for each searchable index of each of the data buyers, encrypting and decrypting the searchable index by a public key unique to a respective one of the data buyers, when building the searchable index; receiving a query that identifies a data buyer of the plurality of data buyers and defines a purchase request for the private data; retrieving the searchable index associated with the data buyer; determining, by the computer, whether at least one of the data providers maintains the private data requested by the data buyer by comparing the purchase request to the searchable index associated with the data buyer; encrypting and decrypting the searchable index associated with the data buyer by a private key unique to the data buyer, when determining whether at least one of the data providers maintains the private data requested; and in response to determining that at least one of the data providers maintains the private data requested, arranging an exchange of the private data requested with the data buyer.

2. The computer-implemented method of claim 1, wherein the private data requested comprises at least one of an address, a telephone number, and a social security number.

3. The computer-implemented method recited by claim 1, wherein the private data requested comprises law enforcement information regarding an individual, the law enforcement information comprising at least one of a driver's license number of the individual and information regarding a criminal history of the individual.

4. The computer-implemented method recited by claim 1, further comprising the step of receiving a legal representation from the data buyer that the data buyer will use the private data requested only in accordance with stated permissible uses.

5. The computer-implemented method recited by claim 1, wherein the registering comprises:
   receiving a legal representation from each data provider that the data provider will provide the private data only in accordance stated permissible uses; and
   receiving a legal representation from each data buyer that the data buyer will use any received private data only in accordance with stated permissible uses.

6. The computer-implemented method recited by claim 5, wherein the registering further comprises:
   receiving registration form data entered by each of the data providers and the data buyers via an on-line registration form;
   validating the registration form data; and
   registering the data providers and data buyers based on an outcome of the validating.

7. The computer-implemented method recited by claim 6, wherein the registration form data for each data provider and data buyer comprises the legal representation provided by the data provider or data buyer.

8. The computer-implemented method recited by claim 1, wherein at least one of the data buyers is a collection agency.

9. The computer-implemented method recited by claim 1, wherein the query comprises an encrypted query and the determining whether at least one of the data providers maintains the private data selected comprises:

generating a decrypted query by decrypting the encrypted query based on the public key unique to the data buyer;
decrypting the searchable index associated with the data buyer based on the private key of the data buyer; and
comparing the decrypted query to at least one record of the decrypted searchable index,
wherein the generating a decrypted query, decrypting the searchable index, and comparing are completed within a search component to securely process the decrypted query and decrypted searchable index.

10. The computer-implemented method recited by claim 1, further comprising transmitting a message to the data buyer advising that the private data requested is not available in response to determining that none of the data providers maintain the private data requested.

11. The computer-implemented method recited by claim 1, wherein the step of building the searchable index for each data buyer comprises:
receiving a separate index from each data provider, each separate index identifying a corresponding data provider and each type of private data available from the corresponding data provider; and
building each searchable index based on the separate index from each data provider.

12. The computer-implemented method recited by claim 11, wherein the query comprises an encrypted query and the determining whether at least one of the data providers maintains the private data selected comprises:
generating a decrypted query by decrypting the encrypted query based on the public key unique to the data buyer;
decrypting the searchable index associated with the data buyer based on the private key of the data buyer; and
comparing the decrypted query to at least one record of the decrypted searchable index,
wherein the generating a decrypted query, decrypting the searchable index, and comparing are completed within a search component to securely process the decrypted query and decrypted searchable index.

13. The computer-implemented method recited by claim 1, wherein the query comprises an encrypted query.

14. The computer-implemented method recited by claim 11, wherein the building a searchable index further comprises:
generating a compiled index by compiling the separate indices received from the data providers.

15. A computer-implemented method for exchanging consumer information, comprising the steps of:
registering a plurality of data providers and a plurality of data buyers;
building, by the computer, a searchable index for each of the data buyers based on at least one index of consumer information for sale provided from one or more of the data providers;
for each searchable index of each of the data buyers, encrypting and decrypting the searchable index by a public key unique to a respective one of the data buyers, when building the searchable index;
receiving a query and a legal representation from a data buyer of the plurality of data buyers, the query defining a purchase request for consumer information and the legal representation indicating that the data buyer will use the consumer information requested only in accordance with stated permissible uses;
retrieving the searchable index associated with the data buyer;
determining, by the computer, whether at least one of the data providers maintains the consumer information requested by the data buyer by comparing the purchase request to the searchable index associated with the data buyer;
encrypting and decrypting the searchable index associated with the data buyer by a private key unique to the data buyer, when determining whether at least one of the data providers maintains the consumer information requested;
in response to determining that at least one of the data providers maintains the consumer information requested, arranging for an exchange of the consumer information requested with the data buyer; and
arranging, by the computer, for delivery of a payment from the data buyer.

16. The computer-implemented method of claim 15, wherein the consumer information requested comprises at least one of an address, a telephone number, and a social security number.

17. The computer-implemented method recited by claim 15, wherein the consumer information requested comprises law enforcement information regarding an individual, the law enforcement information comprising at least one of a driver's license number of the individual and information regarding a criminal history of the individual.

18. The computer-implemented method recited by claim 15, wherein the consumer information requested comprises financial information regarding an individual, the financial information comprising at least one of information regarding a mortgage history of the individual, information regarding a loan history of the individual, and a credit status for the individual.

19. The computer-implemented method recited by claim 15, wherein the registering comprises:
receiving registration form data entered by each of the data providers and the data buyers via an on-line registration form, the legal representation from each data buyer being received as part of the registration form data;
validating the registration form data; and
registering the data providers and data buyers based on an outcome of the validating.

20. The computer-implemented method recited by claim 15, wherein the query comprises an encrypted query and the determining whether at least one of the data providers maintains the consumer information requested comprises:
generating a decrypted query by decrypting the encrypted query based on the public key unique to the data buyer;
decrypting the searchable index associated with the data buyer based on the private key of the data buyer; and
comparing the decrypted query to at least one record of each decrypted searchable index,
wherein the generating a decrypted query, decrypting the searchable index, and comparing are completed within a search component to securely process the decrypted query and decrypted searchable index.

21. The computer-implemented method recited by claim 20, wherein the search component comprises a sandbox container of the computer separate from all other processing activities of the computer.

22. A computer-implemented method for exchanging private data, comprising the steps of:
registering a plurality of data providers and a plurality of data buyers, the registration of each data buyer of the plurality of data buyers comprising receiving a legal representation from the data buyer that the data buyer will use any private data requested only in accordance with stated permissible uses;

building, by the computer, a searchable index for each of
the data buyers based on at least one index of private data
for sale provided from one or more of the data providers;
for each searchable index of each of the data buyers,
encrypting and decrypting the searchable index by a
public key unique to a respective one of the data buyers,
when building the searchable indexes;
receiving an encrypted query that identifies a data buyer of
the plurality of data buyers and defines a purchase
request for private data;
retrieving the searchable index associated with the data
buyer;
determining, by the computer, whether at least one of the
data providers maintains the private data requested by
the data buyer by comparing the purchase request to the
searchable index associated with the data buyer;
encrypting and decrypting the searchable index associated
with the data buyer by a private key unique to the data
buyer, when determining whether at least one of the data
providers maintains the private data requested; and
in response to determining that at least one of the data
providers maintains the private data requested, transmitting a message to the data buyer comprising information
about the private data requested, the cost of purchasing
the private data requested, and an anonymous exchange
identifier code for uniquely identifying the private data
requested.

23. The computer-implemented method recited by claim 22, wherein the private data requested comprises at least one of an address, a telephone number, and a social security number.

24. The computer-implemented method recited by claim 22, wherein the private data requested comprises law enforcement information regarding an individual, the law enforcement information comprising at least one of a driver's license number of the individual and information regarding a criminal history of the individual.

25. The computer-implemented method recited by claim 22, wherein the registering comprises:
receiving registration form data entered by each of the data providers and the data buyers via an on-line registration form;
validating the registration form data; and
registering the data providers and data buyers based on an outcome of the validating.

26. The computer-implemented method recited by claim 22, wherein determining whether at least one of the data providers maintains the private data requested further comprises:
generating a decrypted query by decrypting the encrypted query based on the public key unique to the data buyer;
decrypting the searchable index associated with the data buyer based on the private key of the data buyer; and
comparing the decrypted query to at least one record of the decrypted searchable index,
wherein the generating a decrypted query, decrypting the searchable index, and comparing are completed within a search component sandbox container of the computer separate from all other processing activities of the computer.

27. A computer-implemented method for exchanging consumer information, comprising the steps of:
registering a plurality of data providers and a plurality of data buyers, the registration of each data buyer of the plurality of data buyers comprising receiving a legal representation from the data buyer that the data buyer will use any consumer information requested only in accordance with stated permissible uses;
building, by the computer, a searchable index for each of the data buyers based on at least one index of consumer information for sale provided from one or more of the data providers;
for each searchable index of each of the data buyers, encrypting and decrypting the searchable index by a public key unique to a respective one of the data buyers, when building the searchable indexes;
receiving an encrypted query that identifies a data buyer of the plurality of data buyers and defines a purchase request for consumer information;
retrieving the searchable index associated with the data buyer;
determining, by the computer, whether at least one of the data providers maintains the consumer information requested by the data buyer by comparing the purchase request to the searchable index associated with the data buyer;
encrypting and decrypting the searchable index associated with the data buyer by a private key unique to the data buyer, when determining whether at least one of the data providers maintains the consumer information requested; and
in response to determining that at least one of the data providers maintains the consumer information requested, transmitting a message to the data buyer comprising information about the consumer information requested, the cost of purchasing the consumer information requested, and an anonymous exchange identifier code for uniquely identifying the consumer information requested.

28. The computer-implemented method recited by claim 27, wherein the consumer information requested comprises at least one of an address, a telephone number, and a social security number.

29. The computer-implemented method recited by claim 27, wherein the consumer information requested comprises law enforcement information regarding an individual, the law enforcement information comprising at least one of a driver's license number of the individual and information regarding a criminal history of the individual.

30. The computer-implemented method recited by claim 27, wherein the registering further comprises:
receiving registration form data entered by each of the data providers and the data buyers via an on-line registration form;
validating the registration form data; and
registering the data providers and data buyers based on an outcome of the validating.

31. The computer-implemented method recited by claim 27, wherein determining whether at least one of the data providers maintains the consumer information requested comprises:
generating a decrypted query by decrypting the encrypted query based on the public key unique to the data buyer;
decrypting the searchable index associated with the data buyer based on the private key of the data buyer; and
comparing the decrypted query to at least one record of the decrypted searchable index,
wherein the generating a decrypted query, decrypting the searchable index, and comparing are completed within a search component sandbox container of the computer separate from all other processing activities of the computer.

32. The computer-implemented method of claim 1, wherein the private data requested comprises financial information regarding an individual, the financial information comprising at least one of information regarding a mortgage history of the individual, information regarding a loan history of the individual, and a credit status for the individual.

33. The computer-implemented method of claim 1, wherein the private data requested comprises medical information regarding an individual, the medical information comprising at least one of an age of the individual, information regarding an insurance policy of the individual, a name of a doctor of the individual, and information regarding a medical history of the individual.

34. The computer-implemented method of claim 9, wherein the search component comprises a sandbox container of the computer separate from all other processing activities of the computer.

35. The computer-implemented method of claim 12, wherein the search component comprises a sandbox container of the computer separate from all other processing activities of the computer.

36. The computer-implemented method of claim 1, wherein the method is performed by an entity other than a regulated entity under the Fair Credit Reporting Act.

37. The computer-implemented method of claim 15, wherein the consumer information requested comprises medical information regarding an individual, the medical information comprising at least one of an age of the individual, information regarding an insurance policy of the individual, a name of a doctor of the individual, and information regarding a medical history of the individual.

38. The computer-implemented method recited by claim 22, wherein the private data requested comprises financial information regarding an individual, the financial information comprising at least one of information regarding a mortgage history of the individual, information regarding a loan history of the individual, and a credit status for the individual.

39. The computer-implemented method recited by claim 22, wherein the private data requested comprises medical information regarding an individual, the medical information comprising at least one of an age of the individual, information regarding an insurance policy of the individual, a name of a doctor of the individual, and information regarding a medical history of the individual.

40. The computer-implemented method recited by claim 27, wherein the consumer information requested comprises financial information regarding an individual, the financial information comprising at least one of information regarding a mortgage history of the individual, information regarding a loan history of the individual, and a credit status for the individual.

41. The computer-implemented method recited by claim 27, wherein the consumer information requested comprises medical information regarding an individual, the medical information comprising at least one of an age of the individual, information regarding an insurance policy of the individual, a name of a doctor of the individual, and information regarding a medical history of the individual.

* * * * *